(12) United States Patent
Gutman et al.

(10) Patent No.: US 11,818,581 B2
(45) Date of Patent: Nov. 14, 2023

(54) L1 SECURITY BY ADDING ARTIFICIAL AM/PM

(71) Applicant: QUALCOMM Incorporated, San Diego, CA (US)

(72) Inventors: Igor Gutman, Hod HaSharon (IL); Yavuz Yapici, Florham Park, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 42 days.

(21) Appl. No.: 17/659,421

(22) Filed: Apr. 15, 2022

(65) Prior Publication Data

US 2023/0336999 A1    Oct. 19, 2023

(51) Int. Cl.
*H04W 12/122* (2021.01)
*H04W 12/106* (2021.01)
*H04L 5/00* (2006.01)

(52) U.S. Cl.
CPC ......... *H04W 12/122* (2021.01); *H04L 5/0042* (2013.01); *H04L 5/0051* (2013.01); *H04W 12/106* (2021.01)

(58) Field of Classification Search
CPC .............. H04W 12/122; H04W 12/106; H04L 5/0042; H04L 5/0051
(Continued)

(56) References Cited

U.S. PATENT DOCUMENTS 6,307,980 B1 * 10/2001 Quacchia ............. H04N 17/004
382/268
9,057,772 B1 * 6/2015 Chavez ................. G01S 5/0218
(Continued)

FOREIGN PATENT DOCUMENTS

| CN | 101751959 A | * | 6/2010 | ....... G11B 20/00086 |
| CN | 102651634 A | * | 8/2012 | ........... H03F 1/0255 |

(Continued)

OTHER PUBLICATIONS

Angrisani et al., "Measuring I/Q Impairments in WiMAX Transmitters," in IEEE Transactions on Instrumentation and Measurement, vol. 58, No. 5, pp. 1299-1306, May 2009, doi: 10.1109/TIM.2008.2009141. (Year: 2009).*

(Continued)

*Primary Examiner* — Peter C Shaw
(74) *Attorney, Agent, or Firm* — Procopio, Cory, Hargreaves & Savitch

(57) ABSTRACT

A network node may select a reference AM/PM impairment signature. The network node may transmit, to a UE, a first indication of the reference AM/PM impairment signature via a security signal. The network node may transmit, to the UE, at least one reference signal via a downlink channel. The at least one reference signal may include added AM/PM impairment based on the reference AM/PM impairment signature. The UE may receive, from a transmitter, at least one reference signal via a downlink channel. The UE may estimate an AM/PM impairment signature in the at least one reference signal. The UE may identify whether the estimated AM/PM impairment signature matches a reference AM/PM impairment signature. Further, the UE may maintain or discard at least one slot associated with the downlink channel based on whether the estimated AM/PM impairment signature matches the reference AM/PM impairment signature.

30 Claims, 15 Drawing Sheets

(58) Field of Classification Search
USPC .......................................................... 726/23
See application file for complete search history.

(56) References Cited

U.S. PATENT DOCUMENTS

| | | | |
|---|---|---|---|
| 10,129,283 B1 | 11/2018 | Briggs et al. | |
| 11,184,783 B1 | 11/2021 | Melodia et al. | |
| 2005/0078778 A1* | 4/2005 | Chen | H04B 17/318 375/346 |
| 2005/0123032 A1* | 6/2005 | Chen | H04L 1/206 375/229 |
| 2012/0028567 A1* | 2/2012 | Marko | H04H 20/57 455/3.02 |
| 2016/0014008 A1* | 1/2016 | Metts | H04L 43/16 370/252 |
| 2017/0366209 A1* | 12/2017 | Weissman | H04L 27/38 |
| 2020/0344598 A1 | 10/2020 | Nam et al. | |
| 2020/0396647 A1* | 12/2020 | Lee | H04W 36/32 |

FOREIGN PATENT DOCUMENTS

| | | | | |
|---|---|---|---|---|
| CN | 106165365 A | * | 11/2016 | ............... H03C 5/00 |
| EP | 1505751 A2 | * | 2/2005 | ......... H04B 17/0087 |
| WO | WO-0209313 A2 | * | 1/2002 | ......... H04B 17/0087 |

OTHER PUBLICATIONS

Shimbo et al., "Modulation-Transfer Noise Effects among FM and Digital Signals in Memoryless Nonlinear Devices", IEEE, vol. 74, No. 4, 1986, 0018-9219/86/0400-058$01.00. (Year: 1986).*

Azarmehr M., et al., "Wireless Device Identification Using Oscillator Control Voltage As RF Fingerprint", 2017 IEEE 30th Canadian Conference on Electrical and Computer Engineering (CCECE), IEEE, Apr. 30, 2017, 4 Pages, XP033105477, DOI: 10.1109/CCECE.2017.7946820, The Whole Document.

International Search Report and Written Opinion—PCT/US2023/016330—ISA/EPO—dated Jun. 13, 2023.

Yu P.L., et al., "Wireless Physical Layer Authentication Via Fingerprint Embedding", IEEE Communications Magazine, IEEE Service Center, Piscataway, US, vol. 53, No. 6, Jun. 1, 2015, pp. 48-53, XP011583758, ISSN: 0163-6804, DOI: 10.1109/MCOM.2015.7120016, The Whole Document.

* cited by examiner

L1 SECURITY BY ADDING ARTIFICIAL AM/PM

TECHNICAL FIELD

The present disclosure relates generally to communication systems, and more particularly, to physical layer security in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a transmitter, at least one reference signal via a downlink channel. The apparatus may estimate an amplitude-modulation-to-phase-modulation (AM/PM) impairment signature in the at least one reference signal. The apparatus may identify whether the estimated AM/PM impairment signature matches a reference AM/PM impairment signature. The apparatus may maintain or discard at least one slot associated with the downlink channel based on whether the estimated AM/PM impairment signature matches the reference AM/PM impairment signature.

In an aspect of the disclosure, a method, a computer-readable medium, and an apparatus are provided. The apparatus may be a network node. The apparatus may select a reference AM/PM impairment signature. The apparatus may transmit, to a UE, a first indication of the reference AM/PM impairment signature via a security signal. The apparatus may transmit, to the UE, at least one reference signal via a downlink channel. The at least one reference signal may include added AM/PM impairment based on the reference AM/PM impairment signature.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
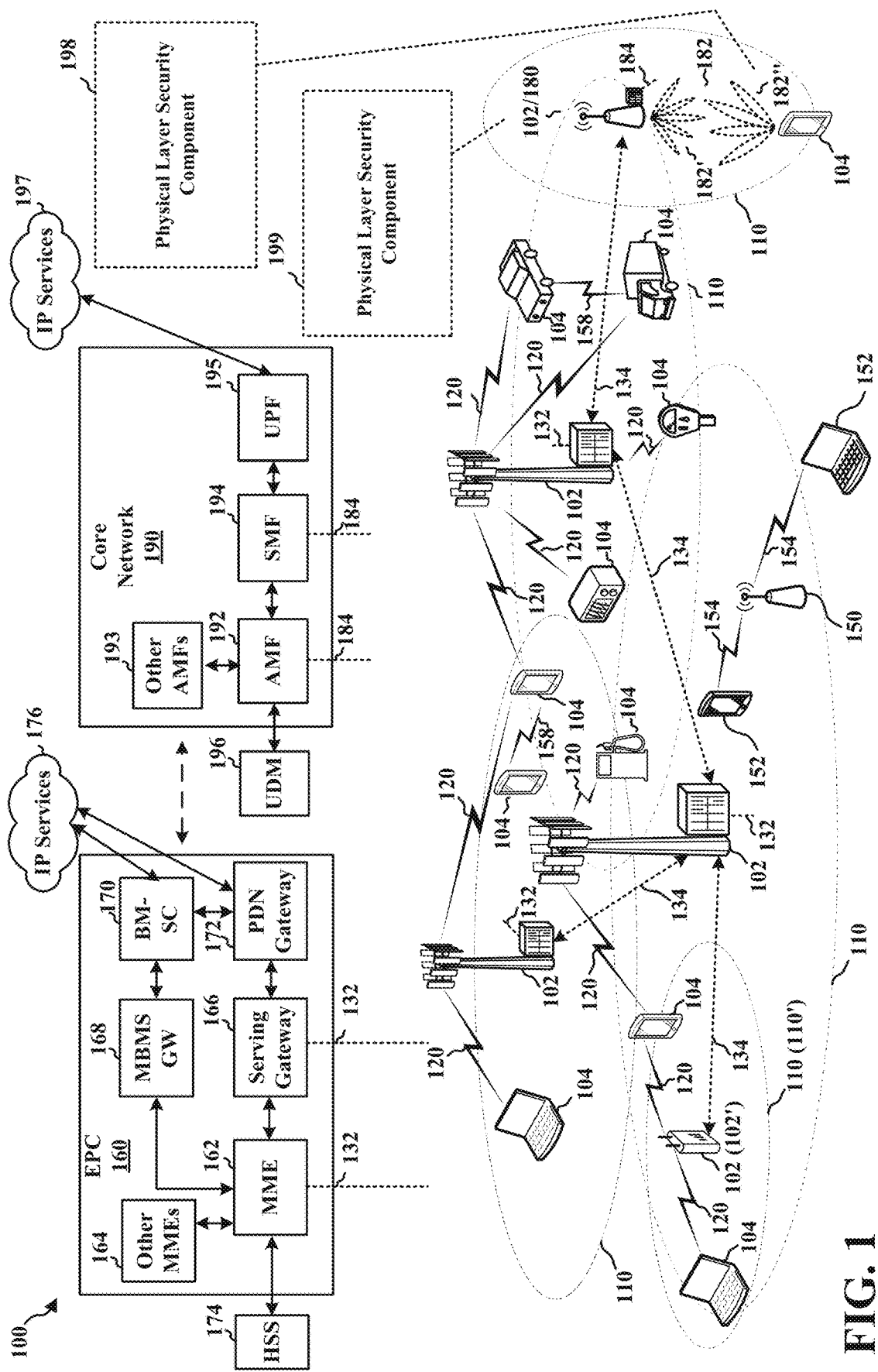
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Security is an important and integral part of wireless communications. Advancement in quantum computing may represent a future risk to the existing cryptography-based approaches to security. In addition, due to latency concerns, some scheduled downlink transmissions may not be protected by the cryptography-based security. Absent sufficient security measures, malicious intruders (e.g., adversary transmitters) may challenge or even hijack (e.g., spoof) the unprotected transmission by fabricating a transmission that is associated with the same format as a legitimate transmission. Without layer 1 (L1) (i.e., the physical layer) security, a UE may not be able to distinguish between the true (legitimate) transmission and the fabricated transmission.

One or more aspects of the disclosure may relate to adding an additional layer of security in L1. The presence of the physical layer security may provide an additional layer of security to deal with the quantum threat. Further, use of the physical layer security may help to reduce the load in layer 3 (L3), where applicable, and may, accordingly, help to reduce the latency and overhead. Moreover, use of the physical layer security may help to reduce the chances of becoming a victim of malicious intruders for protocols at layers below L3. In one or more configurations, a legitimate transmitter may add scrambling in L1 when transmitting a physical channel or a slot. Accordingly, the receiver may identify whether a transmission is from the legitimate transmitter based on detecting whether the transmission contains the expected scrambling in L1.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a physical layer security component 198 that may be configured to receive, from a transmitter, at least one reference signal via a downlink channel. The physical layer security component 198 may be configured to estimate an AM/PM impairment signature in the at least one reference signal. The physical layer security component 198 may be configured to identify whether the estimated AM/PM impairment signature matches a reference AM/PM impairment signature. The physical layer security component 198 may be configured to maintain or discard at least one slot associated with the downlink channel based on whether the estimated AM/PM impairment signature matches the reference AM/PM impairment signature. In certain aspects, the base station/network node 180 may include a physical layer security component 199 that may be configured to select a reference AM/PM impairment signature. The physical layer security component 199 may be configured to transmit, to a UE, a first indication of the reference AM/PM impairment signature via a security signal. The physical layer security component 199 may be configured to transmit, to the UE, at least one reference signal via a downlink channel. The at least one reference signal may include added AM/PM impairment based on the reference AM/PM impairment signature. Although the following description may be focused on 5G NR, the concepts described herein may be applicable to other similar areas, such as LTE, LTE-A, CDMA, GSM, and other wireless technologies.

Figure 2:
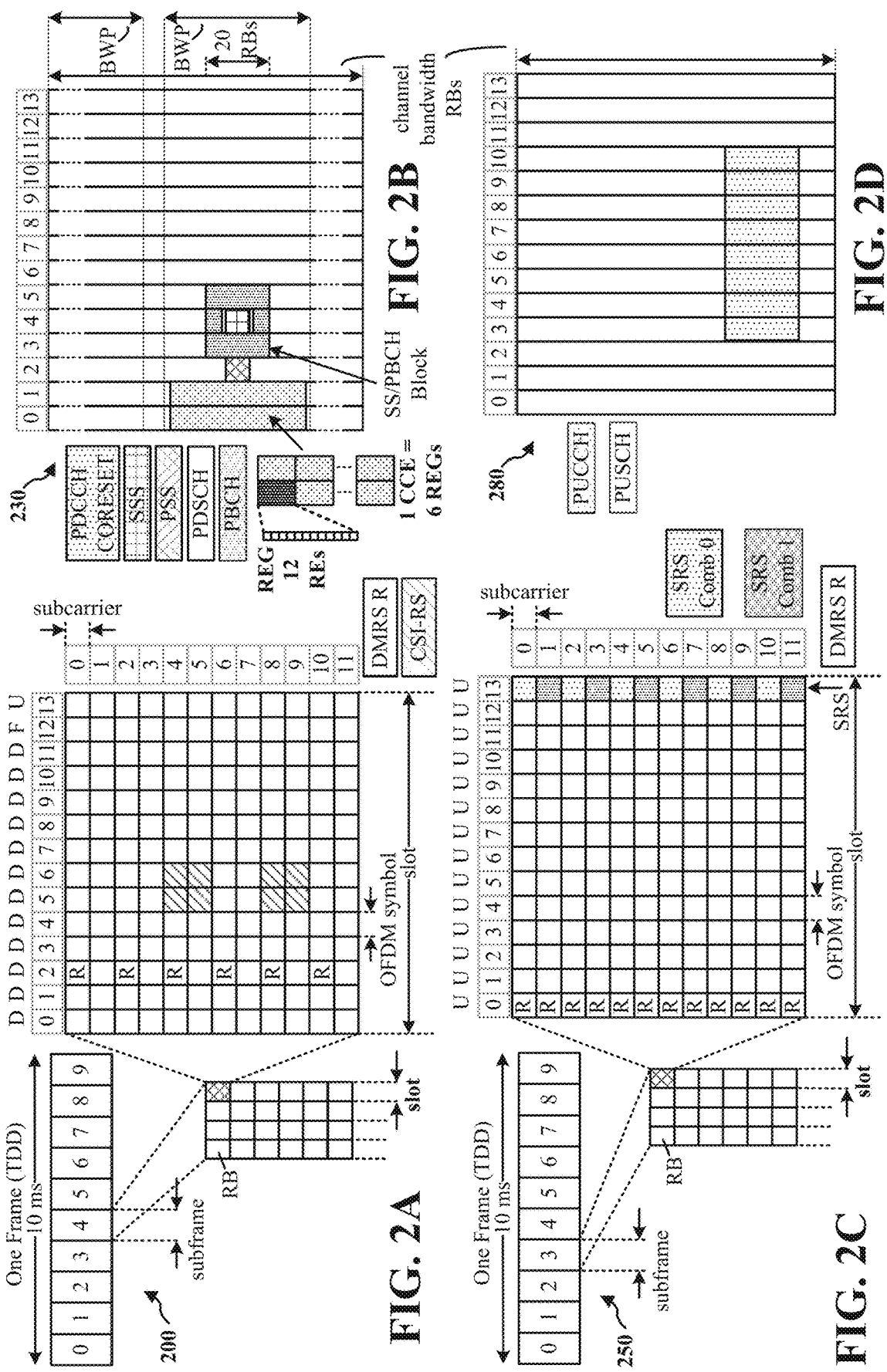
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies ($\mu$) 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology p=4 has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS or DMRS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
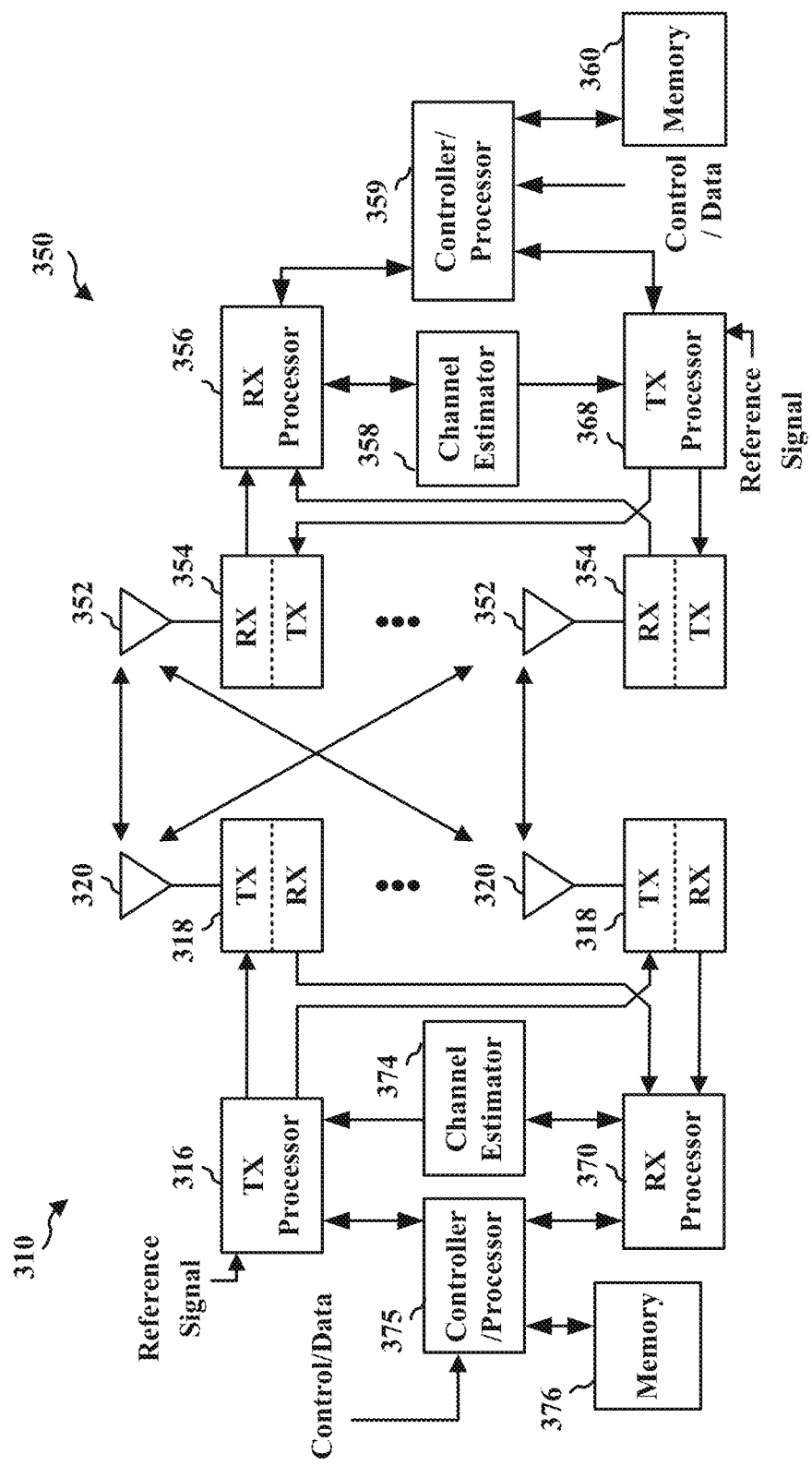
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Herein a network node can be implemented as an aggregated base station, as a disaggregated base station, an integrated access and backhaul (IAB) node, a relay node, a sidelink node, etc. A network node/entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

Security is an important and integral part of wireless communications. Communication security may serve to protect confidential or sensitive information such as personal data or in different applications such as commercial applications (e.g., financial, medical, pharmaceutical applications, etc.), applications in government organizations, applications in the military, or social network applications.

In some configurations, the link security may be achieved using cryptography, which may provide security via higher layer (e.g., L3 or above) algorithms. One advantage associated with cryptography-based security may be that hacking cryptographic algorithms may take such a long time that the cryptographic algorithms may be considered practically unbreakable. On the other hand, disadvantages associated with cryptography-based security may include that the cryptographic algorithms may introduce significant overhead, especially for small packets, and may increase latency. For example, a 256- or 128-bit security key may add significant overhead on the transmission of small packets, as well as may determine the lower bound.

Furthermore, advancement in quantum computing may represent a future risk to the existing cryptography-based approaches. In particular, quantum mechanics may make use of features, such as superposition, such that a quantum bit may exist in a combination of several states at once, which may, hypothetically, reduce the hacking complexity of an exhaustive search from exponential complexity to linear complexity.

In addition, due to latency concerns, some scheduled downlink transmissions may not be protected by the cryptography-based security. For example, such downlink transmissions may include MAC signaling (e.g., a MAC—control element (MAC-CE)), for which a low communication delay may be more important than reliability. Examples of downlink transmissions not protected by the cryptography-based security may also include broadcast information (e.g., a SIB) and paging information.

Absent sufficient security measures, malicious intruders (e.g., adversary transmitters) may challenge or even hijack (e.g., spoof) the unprotected transmission by fabricating a transmission (e.g., a transmission of a PDCCH or a PDSCH) that is associated with the same format as a legitimate transmission. Without L1 (i.e., the physical layer) security, a UE may not be able to distinguish between the true (legitimate) transmission and the fabricated transmission.

One or more aspects of the disclosure may relate to adding an additional layer of security in L1. Physical layer security may not entirely replace L3-based security. However, physical layer security may be associated with a number of improvements compared to scenarios where no physical layer security is utilized. For example, the presence of the physical layer security may provide an additional layer of security to deal with the quantum threat. Further, use of the physical layer security may help to reduce the load in L3, where applicable, and may, accordingly, help to reduce the latency and overhead. Moreover, use of the physical layer security may help to reduce the chances of becoming a victim of malicious intruders for protocols at layers below L3.

In one or more configurations, a legitimate transmitter may add scrambling in L1 when transmitting a physical channel or a slot. Accordingly, the receiver may identify whether a transmission is from the legitimate transmitter based on detecting whether the transmission contains the expected scrambling in L1.

In one or more configurations, physical layer security representing an additional layer of security may be based on (natural or artificial) amplitude-modulation-to-phase-modulation (AM/PM) impairment. The natural AM/PM impairment may be a physical impairment that may naturally exist in almost every power amplifier. For example, the function for the AM/PM impairment may be $f(x)=|x| \cdot e^{j \cdot \Phi(|x|)}$, where x may be the time domain signal, φ may be the AM/PM mapping, and f(x) may be the operator that includes the AM/PM.

The AM/PM impairment may not be an energetic impairment. Therefore, adding the AM/PM impairment may not consume any additional power, which may make the AM/PM impairment a good candidate factor for physical layer security. However, using the AM/PM impairment may add constraints on the error vector magnitude (EVM) and/or out-of-band emissions.

In one or more configurations, the natural AM/PM impairment may be used for the physical layer security. Because the natural AM/PM impairment may exist in practically all power amplifiers, a receiver may determine whether a transmission is legitimate by comparing the AM/PM impairment signature associated with the transmission with a reference (anchor) natural AM/PM impairment signature associated with the legitimate transmitter. If the AM/PM impairment signature associated with the transmission does not match the reference natural AM/PM impairment signature associated with the legitimate transmitter, the receiver may classify the transmission as a malicious attack, and may perform further operations accordingly (e.g., the receiver may drop or discard the transmission).

Figure 4:
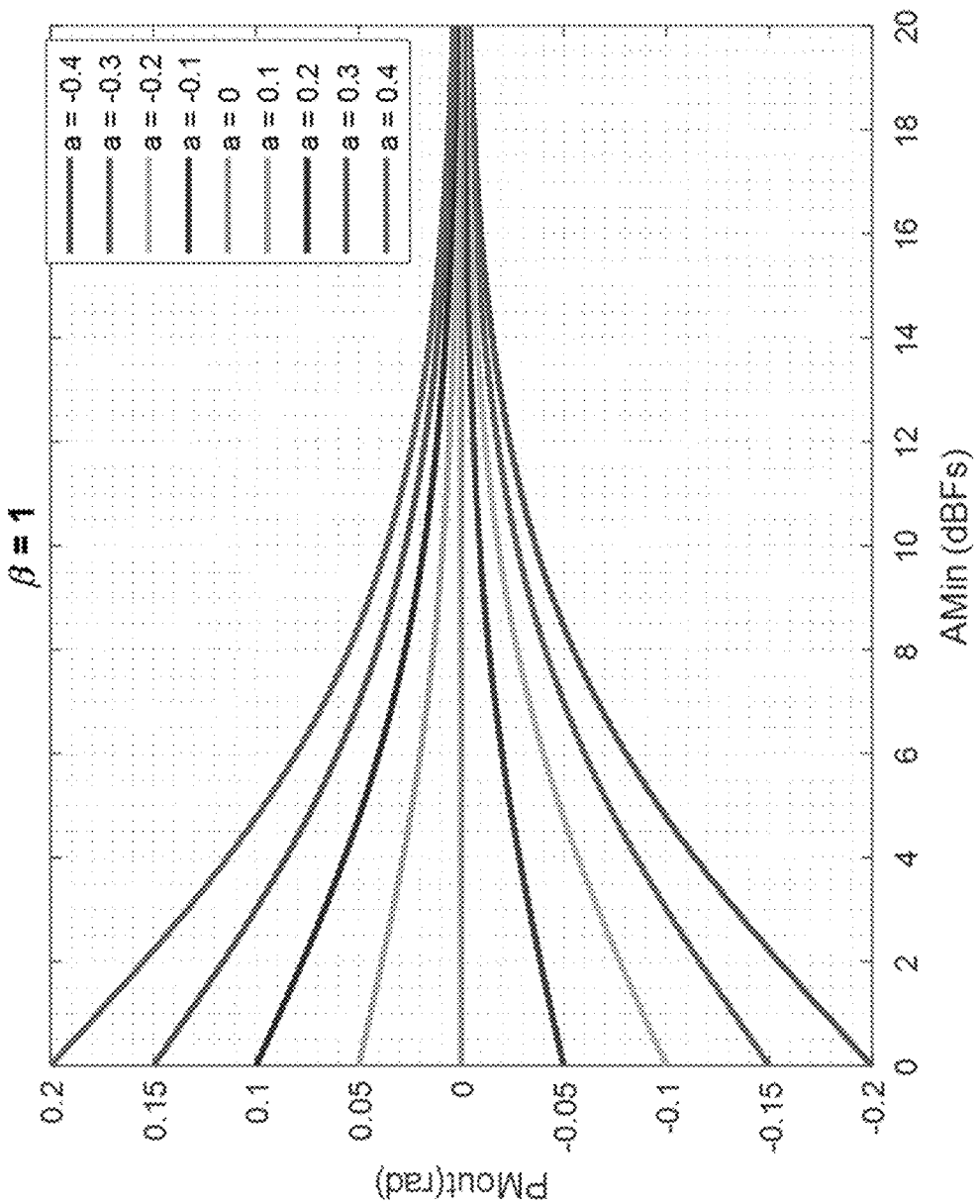
FIG. 4 is a diagram illustrating an example AM/PM impairment model in accordance with various aspects of the present disclosure.

FIG. 4 is a diagram 400 illustrating an example AM/PM impairment model. In the diagram 400, the x-axis may correspond to the AM, and the y-axis may correspond to the PM. Further, α and β may be parameters that represent the example AM/PM mapping model. The diagram 400 may correspond to the formula $$\phi(|x|) = Lx + \frac{\alpha \cdot |x|^2}{1 + \beta \cdot |x|^2}.$$

In some examples, the natural AM/PM impairment may not be used for the physical layer security because as shown in FIG. 4, the example natural AM/PM impairment model may be similar for all options, where each option may correspond to a value for α. Accordingly, the tradeoff between false positives (e.g., failing to detect a transmission from an intruder) and false negatives (e.g., discarding a transmission from the legitimate transmitter) may be unsatisfactory. In addition, it may be undesirable to use the natural AM/PM impairment for the physical layer security because digital pre-distortion (DPD) may be applied at the transmitter (without DPD, the out-of-band emissions due to the natural AM/PM impairment may violate the specification), which may significantly reduce or eliminate the natural AM/PM impairment (i.e., setting the natural AM/PM impairment signature to 0 or close to 0). Therefore, there may not be a distinguishable natural AM/PM impairment signature left in a legitimate transmission for the receiver to identify.

In one or more configurations, an artificial AM/PM impairment may be deliberately added to the transmission at the transmitter for the physical layer security. Accordingly, a receiver may determine whether a transmission is legitimate by comparing the AM/PM impairment signature associated with the transmission with a reference (anchor) artificial AM/PM impairment signature associated with the legitimate transmitter. In one or more configurations, because the AM/PM impairment has no energetic limitation, the artificial AM/PM impairment may be added in the time domain in the baseband domain of the transmitter.

In one configuration, the artificial AM/PM impairment may be added in a digital-to-analog converter (DAC) rate (e.g., the sampling rate of the DAC). Adding the artificial AM/PM impairment in the DAC rate may make the artificial AM/PM impairment appear more natural (e.g., more closely resemble the natural AM/PM impairment introduced by the power amplifier). However, adding the artificial AM/PM impairment in the DAC rate may lead to a violation of the out-of-band emissions specification. Accordingly, in one configuration, the artificial AM/PM impairment may be added in the baseband rate. Adding the artificial AM/PM impairment in the baseband rate may be useful at least for FR1, where to comply with the out-of-band emissions specification may be challenging. In one or more configurations, adding the artificial AM/PM impairment may not be associated with any (significant) power consumption.

Further, in one or more configurations, DPD may be used to at least partially eliminate the natural AM/PM impairment. As the natural AM/PM impairment is eliminated, the transmitter (e.g., a network node) may be better able to control the overall AM/PM impairment signature in the transmission based on controlling the added artificial AM/PM impairment in the baseband digital domain.

Figure 5:
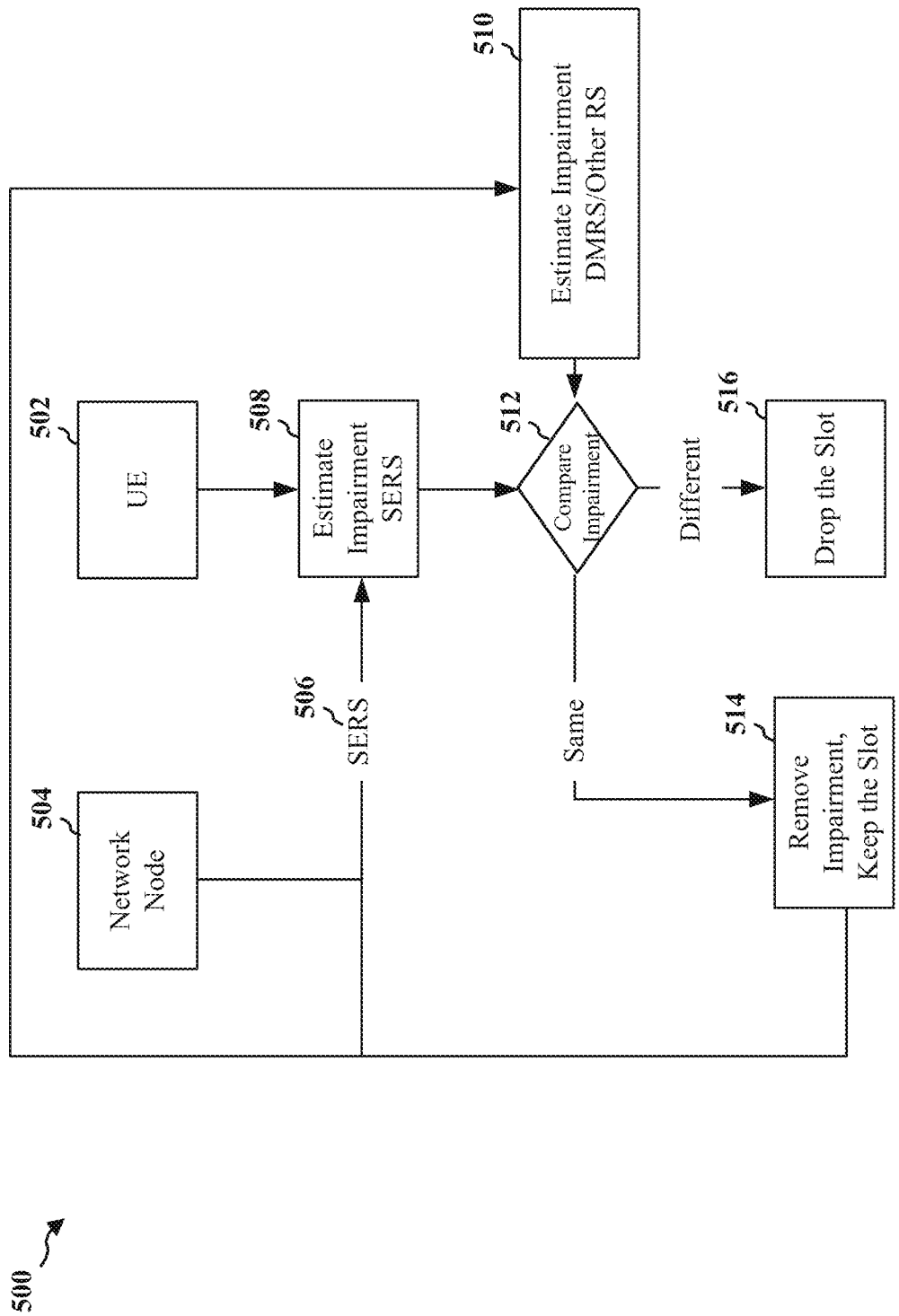
FIG. 5 is a diagram of a communication flow of a method of wireless communication in accordance with various aspects of the present disclosure.

FIG. 5 is a diagram of a communication flow 500 of a method of wireless communication according to one or more aspects. As shown in FIG. 5, a network node 504 may transmit (e.g., broadcast), to a UE 502, a security RS 506 (SERS). The SERS 506 may include an added artificial AM/PM impairment, and may serve to indicate to the UE 502 a reference AM/PM impairment signature associated with network node 504. The SERS 506 may be distinct from the RSs described above in relation to FIGS. 2A-2C. In some examples, the process for selecting the reference AM/PM impairment signature may be prespecified or preconfigured. In some configurations, the network node 504 may periodically (e.g., more than once, with a period/frequency), or from time-to-time, transmit the SERS 506. Further, the artificial AM/PM impairment included in the SERS 506 may be updated or refreshed (changed) periodically or from time-to-time. At 508, the UE 502 may estimate the AM/PM impairment included in the SERS 506, and may store or remember the AM/PM impairment included in the SERS 506 as the reference AM/PM impairment signature associated with the network node 504.

The use of a SERS by the network node 504 to indicate the reference AM/PM impairment signature may be suitable or advantageous when the UE 502 is not in a connected mode (e.g., when the UE 502 is in the idle mode) and does not have any higher layer communication or traffic. In one or more configurations, when the UE 502 is in an RRC connected state (RRC_connected), the network node 504 may indicate the reference AM/PM impairment signature to the UE 502 via higher level communication (e.g., RRC signaling). It should be appreciated that increasing the frequency of the reference AM/PM impairment signature update or refresh may improve security, as there may be less time, and accordingly it may be more challenging, for an intruder to sniff and identify the reference AM/PM impairment signature before the next reference AM/PM impairment signature update/refresh.

Thereafter, the network node 504 may transmit, to the UE 502, downlink traffic (e.g., a slot including a PDSCH and/or a PDCCH) that may contain an RS (e.g., a DMRS). In one configuration, when transmitting the downlink traffic, the network node 504 may add an artificial AM/PM impairment signature to the RS. The artificial AM/PM impairment signature added to the RS may be the same as the artificial AM/PM impairment included in the SERS 506. In one or more configurations, for additional security, the network node 504 may also add the artificial AM/PM impairment signature to at least one data portion of the downlink traffic.

Accordingly, at 510, the UE 502 may estimate the AM/PM impairment signature associated with the RS, and may, at 512, compare the AM/PM impairment signature associated with the RS to the reference AM/PM impairment signature associated with the network node 504.

If the AM/PM impairment signature associated with the RS matches the reference AM/PM impairment signature associated with the network node 504 (i.e., the AM/PM impairment signatures are the same), then, at 514, UE 502 may keep and use the slot corresponding to the downlink traffic (e.g., after removing the AM/PM impairment), as the slot is likely to have been received from the legitimate network node 504. Otherwise, if the AM/PM impairment signature associated with the RS does not match the reference AM/PM impairment signature associated with the network node 504 (i.e., the AM/PM impairment signatures are different), then, at 516, UE 502 may drop or discard the slot corresponding to the downlink traffic, as the slot is likely to have been received from an adversary transmitter (not shown). The UE 502 may drop or discard a slot by refraining from decoding or otherwise further processing the slot.

Figure 6:
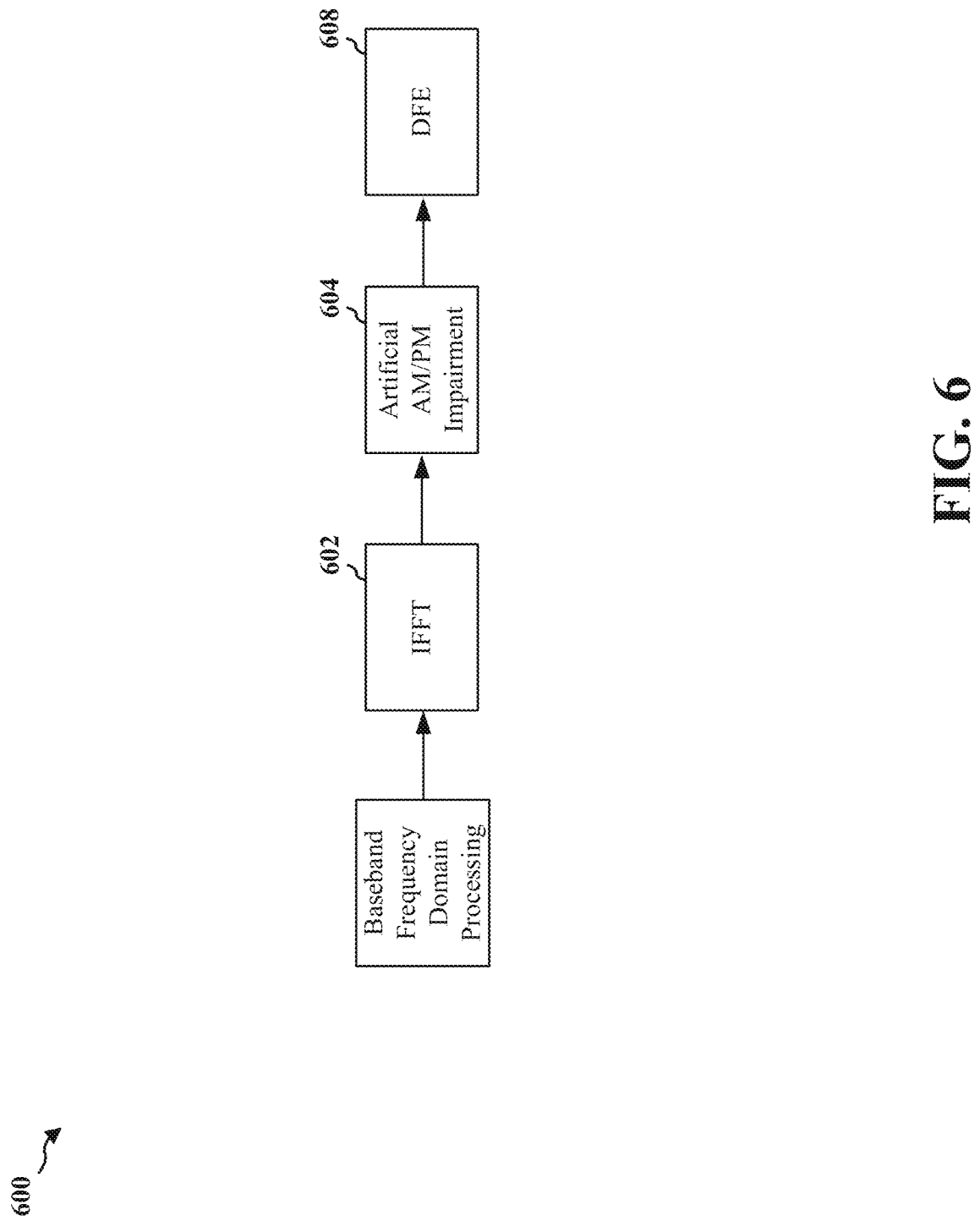
FIG. 6 is a block diagram illustrating addition of an artificial AM/PM impairment in accordance with various aspects of the present disclosure.

FIG. 6 is a block diagram 600 illustrating addition of an artificial AM/PM impairment according to one or more aspects. Adding the artificial AM/PM impairment in the oversampled domain (e.g., the output of the digital front-end (DFE) block 608, also known as the DAC input) may introduce out-of-band leakage, which may lead to a violation of the adjacent channel leakage ratio (ACLR) specification. Accordingly, in one or more configurations, the artificial AM/PM impairment may be added in the baseband domain at block 604 between the IFFT block 602 and the DFE block 608.

Because the artificial AM/PM impairment is introduced in the baseband domain, all the impairment is folded to the in-band, which may be associated with a cost in terms of the EVM. Further, the added artificial AM/PM impairment may be removed at the receiver. However, due to other impairments (e.g., thermal noise, channel noise, etc.) the removal of the artificial AM/PM impairment at the receiver may not be perfect. In one or more configurations, if the artificial AM/PM impairment is also added to the at least one data portion of the downlink traffic (e.g., PDSCH and/or PDCCH), a digital post-distortion (DPoD) technique (which may be applied iteratively) may be utilized to improve (e.g., reduce) the EVM associated with the at least one data portion of the downlink traffic.

In one or more configurations, the addition at the transmitter of the artificial AM/PM impairment may be represented using the formulas below:

$$x[n] = |x[n]| \cdot e^{-j \cdot \phi(|x[n]|)}$$

$$\Phi(|x[n]|) = \begin{cases} A_m \cdot \sin((|x[n]| - D) \cdot F) & D < |x[n]| < D + \dfrac{2 \cdot \alpha \cdot \pi}{F} \\ 0 & \text{else} \end{cases}$$

where α may be the number of cycles of the sinusoidal function, D may be the delay, F may be the frequency, and $A_m$ may be the amplitude. Increasing the values of F, α, and/or $A_m$ may make it more difficult for an aggressor (which may also be referred to as an adversary transmitter) to fix (e.g., remove) the added artificial AM/PM impairment signature, thereby improving security. However, it should be appreciated that there may be a tradeoff between security and the signal-to-noise ratio (SNR). In practice, however, a security improvement of over 90% may be achieved with a very small performance loss even when the aggressor knows the range of possible added artificial AM/PM impairment signatures.

Figures 7A, 7B:
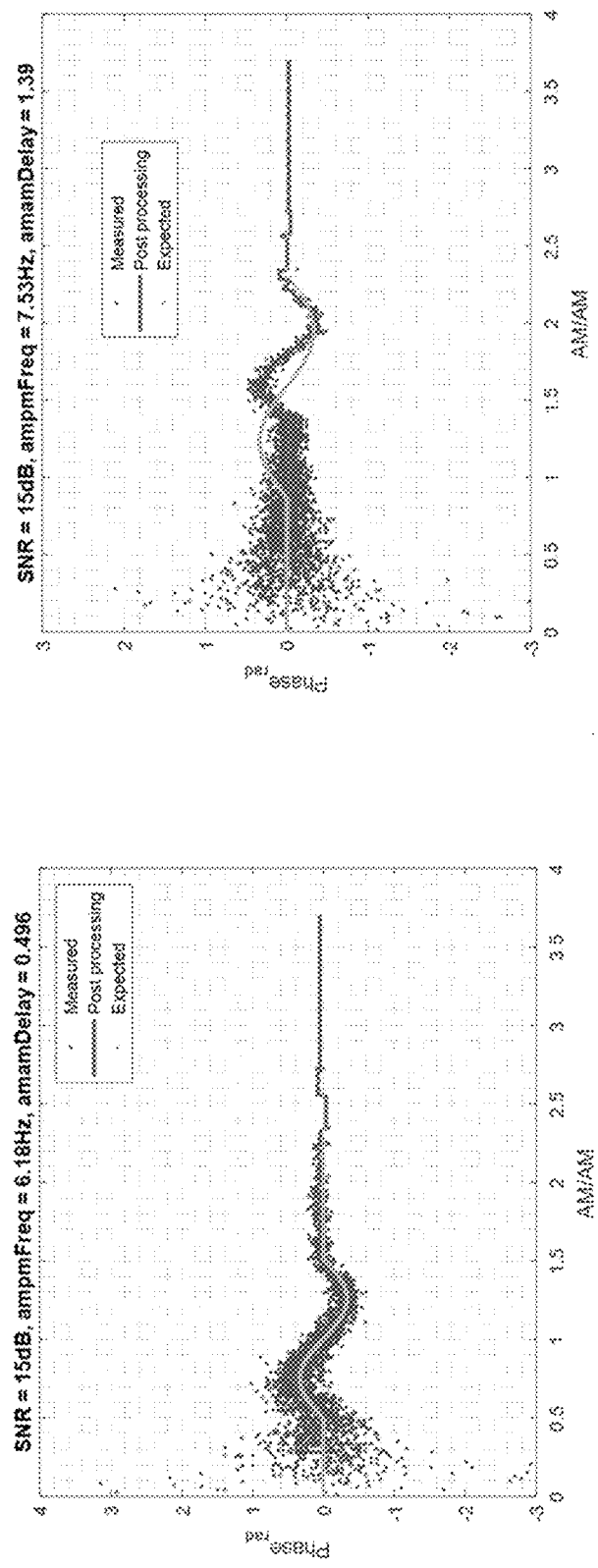
FIG. 7A is a diagram illustrating an example scenario where the AM/PM impairment signature associated with the reference signal (RS) in the downlink traffic matches the reference AM/PM impairment signature associated with the legitimate transmitter, in accordance with various aspects of the present disclosure.
FIG. 7B is a diagram illustrating an example scenario where the AM/PM impairment signature associated with the RS in the downlink traffic does not match the reference AM/PM impairment signature associated with the legitimate transmitter, in accordance with various aspects of the present disclosure.

FIG. 7A is a diagram 700A illustrating an example scenario where the AM/PM impairment signature associated with the RS in the downlink traffic matches the reference AM/PM impairment signature associated with the legitimate transmitter. FIG. 7B is a diagram 700B illustrating an example scenario where the AM/PM impairment signature associated with the RS in the downlink traffic does not match the reference AM/PM impairment signature associated with the legitimate transmitter. In both scenarios illustrated in FIGS. 7A and 7B, single symbol processing may be used.

Referring back to FIG. 5, in one or more configurations, when the UE 502 compares, at 512, the AM/PM impairment signature associated with the RS to the reference AM/PM impairment signature associated with the network node 504, the UE 502 may identify a correlation amount (correlation metric) associated with the correlation between the AM/PM impairment signature associated with the RS and the reference AM/PM impairment signature associated with the network node 504. If the correlation amount is greater than a threshold, the UE 502 may identify that the AM/PM impairment signature associated with the RS matches the reference AM/PM impairment signature associated with the network node 504. On the other hand, if the correlation amount is less than the threshold, the UE 502 may identify that the AM/PM impairment signature associated with the RS does not match the reference AM/PM impairment signature associated with the network node 504.

In one or more examples, the correlation metric may be identified based on a maximal-ratio combining (MRC) approach, where a greater weight may be given to a greater amplitude. In particular, in one non-limiting example, the correlation metric may be identified based on the formula below:

correlation metric =

$$\dfrac{\sum_{n \in amAmSpan} amAm^2(n) \cdot amPm^{RS}(n) \cdot amPm^{REFERNCE}(n)}{\text{rms}(amAm(n) \cdot amPm^{RS}) \cdot \text{rms}(amAm(n) \cdot amPm^{REFERENCE}) \cdot N}$$

where am may be the respective amplitude, and rms may be the root mean square (quadratic mean).

Figure 8:
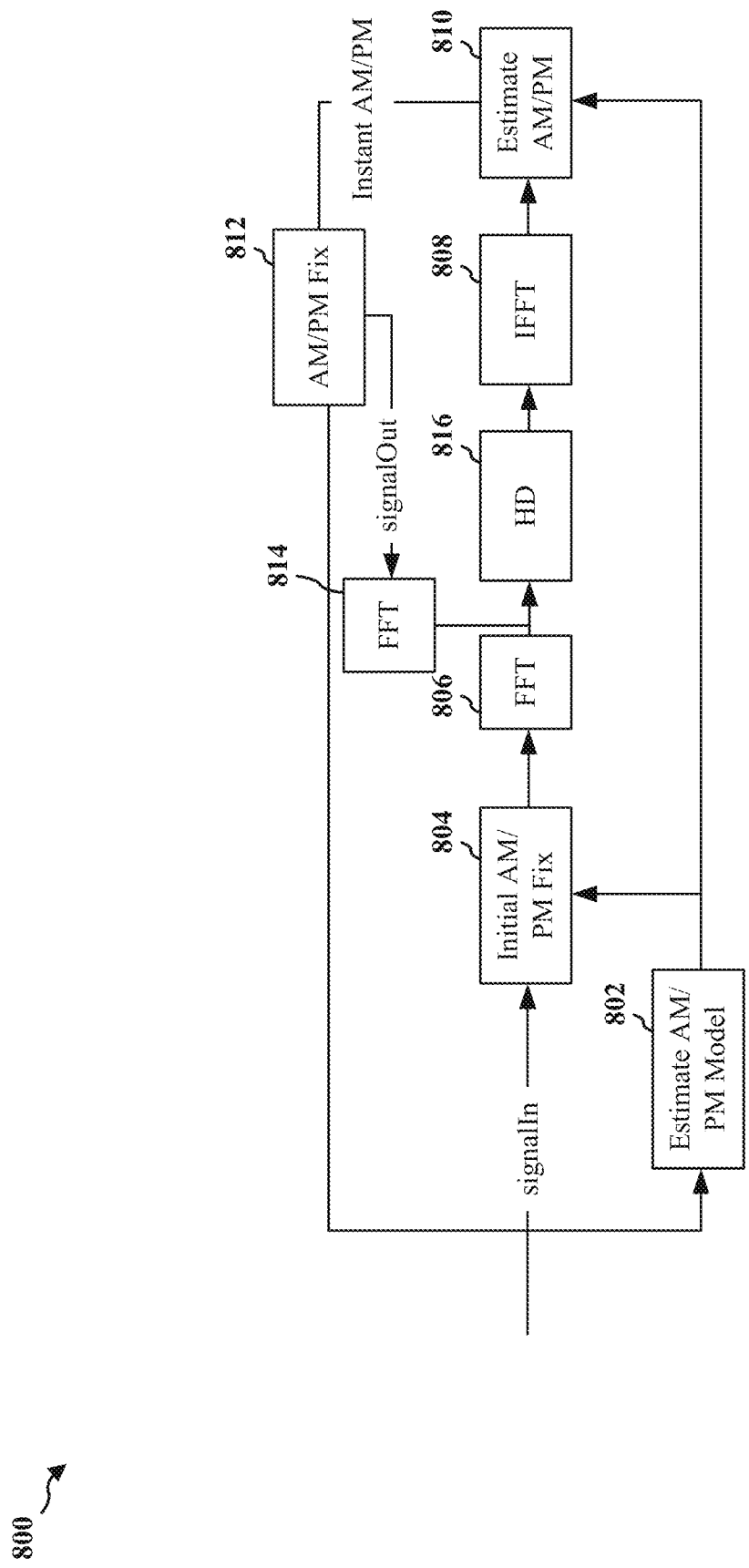
FIG. 8 is a block diagram illustrating an iterative digital post-distortion (DPoD) process in accordance with various aspects of the present disclosure.

FIG. 8 is a block diagram 800 illustrating an iterative DPoD process. In one or more configurations, the iterative DPoD technique may be utilized when the transmitter also adds the artificial AM/PM impairment signature to the data portion of the traffic. At a receiver, at 802, an AM/PM impairment model may be estimated. Based on the estimated AM/PM impairment model, an initial AM/PM impairment fix/removal 804 may be attempted, the result of which may be fed into a first FFT block 806 to perform DPoD. A hard decision (HD) block 816 may precede the IFFT block 808. Based on the output of the IFFT block 808, at 810, another estimate of an AM/PM impairment model may be performed. Then, another AM/PM impairment fix/removal 812 may be attempted based on the additional AM/PM impairment model estimate at 810. Thereafter, the result of the additional AM/PM impairment fix/removal 812 may be fed into a second FFT block 814 to perform additional DPoD. Accordingly, the DPoD process may be performed iteratively to remove the artificial AM/PM impairment. It should be appreciated that the DPoD technique (regular or iterative) may work based on exploiting that the symbols belong to a finite set in the frequency domain.

Figure 9:
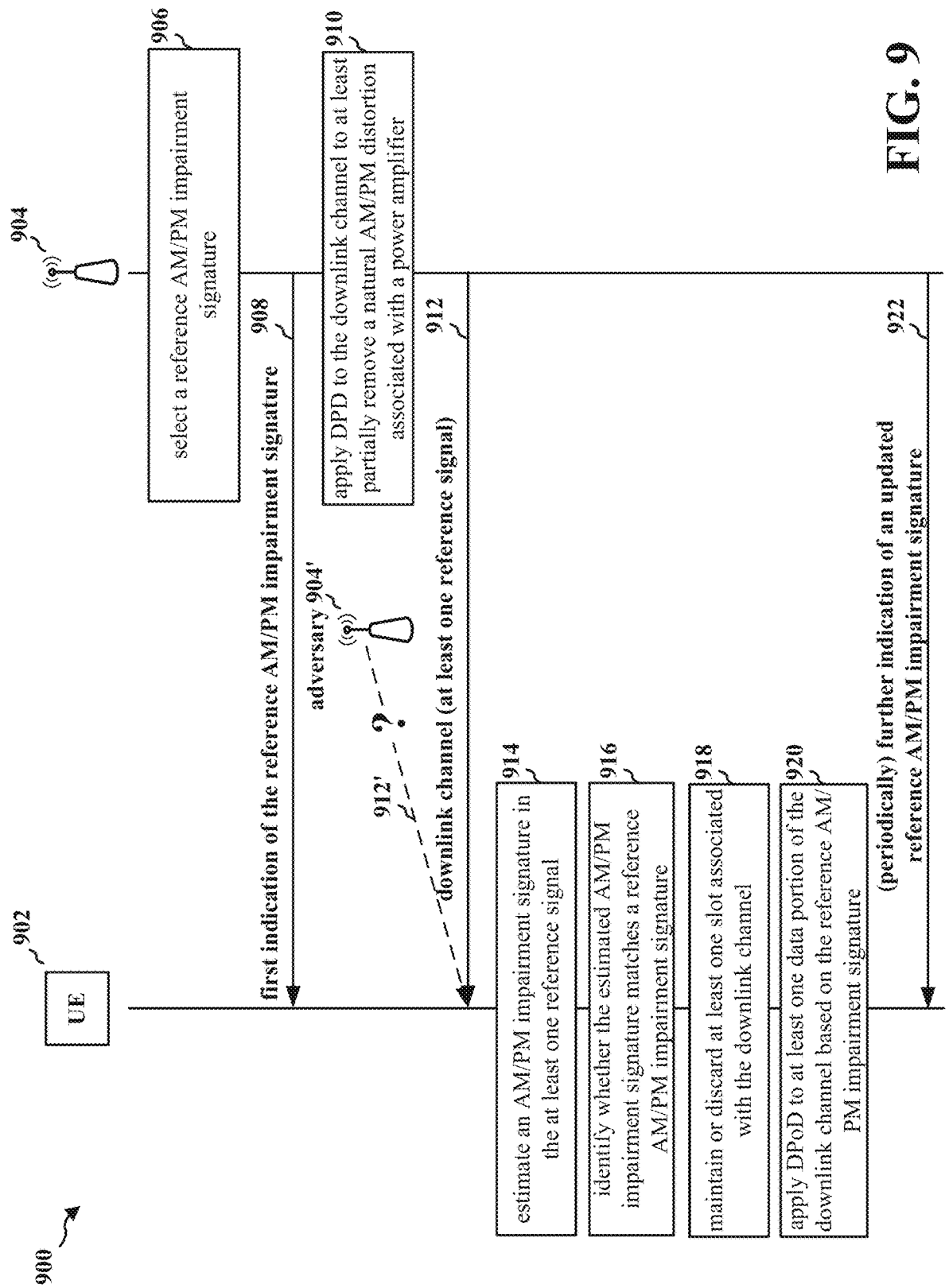
FIG. 9 is a diagram of a communication flow of a method of wireless communication in accordance with various aspects of the present disclosure.

FIG. 9 is a diagram of a communication flow 900 of a method of wireless communication. At 906, the network node 904 may select a reference AM/PM impairment signature.

At 908, the network node 904 may transmit, to a UE 902, and the UE 902 may receive, from the network node 904, a first indication of the reference AM/PM impairment signature via a security signal.

In one or more configurations, the security signal may correspond to a SERS or RRC signaling.

At 910, the network node 904 may apply DPD to a downlink channel to at least partially remove a natural AM/PM distortion associated with a power amplifier.

At 912, the network node 904 may transmit, to the UE 902, and the UE 902 may receive, from the network node 904, at least one reference signal via a downlink channel. The at least one reference signal may include added AM/PM impairment based on the reference AM/PM impairment signature. In one configuration, the added AM/PM impairment may be added to the at least one reference signal in a baseband domain. In one configuration, the added AM/PM impairment may be further added by the network node 904 to at least one data portion of the downlink channel.

At 912', the UE 902 may receive, from an adversary transmitter 904', at least one reference signal via a downlink channel.

In one configuration, the at least one reference signal may be a DMRS. In one or more configurations, the downlink channel may be a PDCCH or a PDSCH.

At 914, the UE 902 may estimate an AM/PM impairment signature in the at least one reference signal.

At 916, the UE 902 may identify whether the estimated AM/PM impairment signature matches a reference AM/PM impairment signature.

In one configuration, whether the estimated AM/PM impairment signature matches the reference AM/PM impairment signature may be identified based on a correlation amount between the estimated AM/PM impairment signature and the reference AM/PM impairment signature. In one configuration, the correlation amount may be identified based on an MRC approach.

At 918, the UE 902 may maintain or discard at least one slot associated with the downlink channel based on whether the estimated AM/PM impairment signature matches the reference AM/PM impairment signature.

In one configuration, the at least one slot may be maintained if the estimated AM/PM impairment signature matches the reference AM/PM impairment signature. The at least one slot may be discarded if the estimated AM/PM impairment signature does not match the reference AM/PM impairment signature. In one configuration, the transmitter may correspond to the network node 904 if the estimated AM/PM impairment signature matches the reference AM/PM impairment signature. The transmitter may correspond to an adversary transmitter 904' if the estimated AM/PM impairment signature does not match the reference AM/PM impairment signature.

At 920, the UE 902 may apply DPoD to at least one data portion of the downlink channel based on the reference AM/PM impairment signature.

At 922, the UE 902 may receive, periodically from the network node 904, a further indication of an updated reference AM/PM impairment signature.

Figure 10:
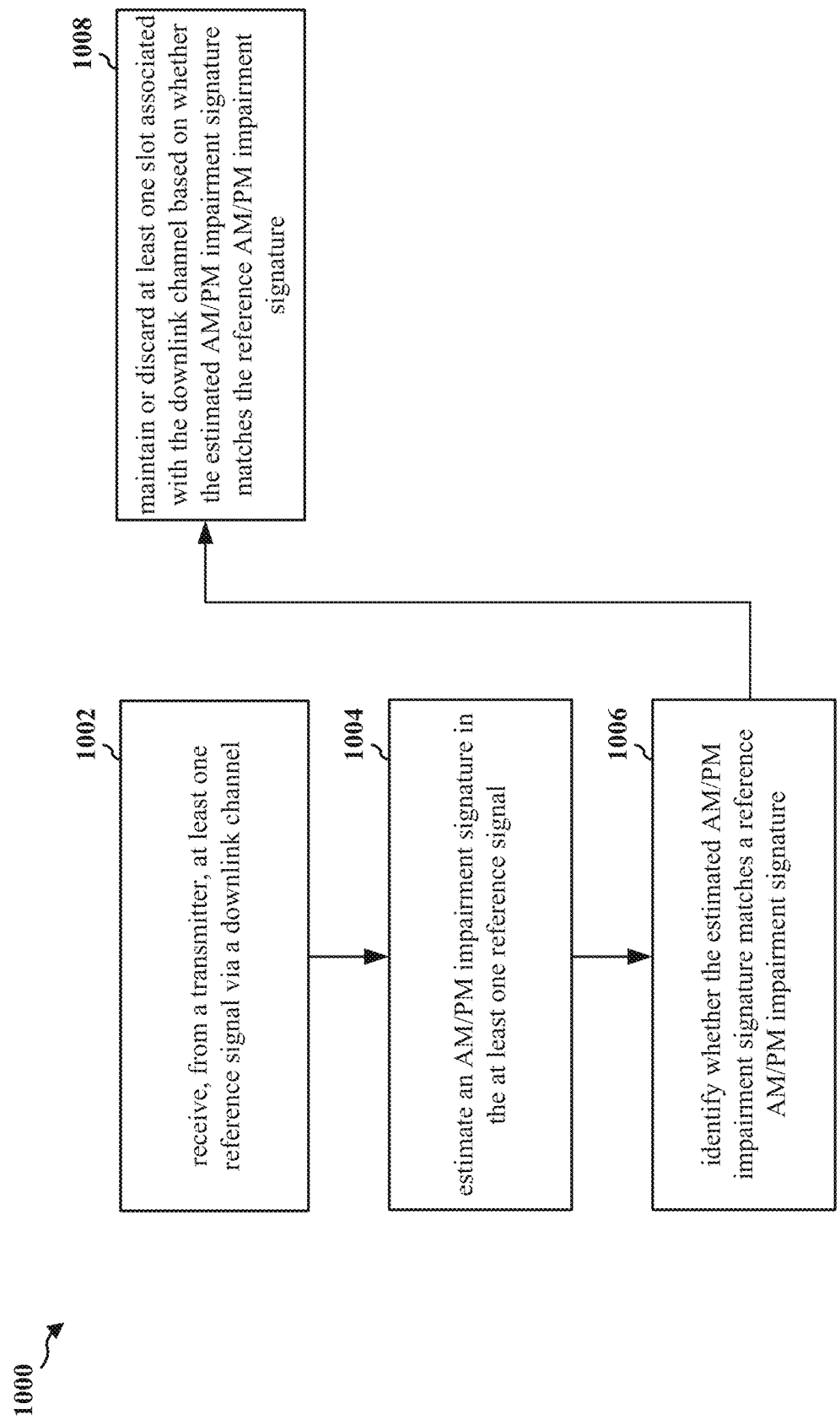
FIG. 10 is a flowchart of a method of wireless communication in accordance with various aspects of the present disclosure.

FIG. 10 is a flowchart 1000 of a method of wireless communication. The method may be performed by a UE (e.g., the UE 104/350/502/902; the apparatus 1402). At 1002, the UE may receive, from a transmitter, at least one reference signal via a downlink channel. For example, 1002 may be performed by the physical layer security component 1440 in FIG. 14. Referring to FIG. 9, at 912 or 912', the UE 902 may receive, from a transmitter (a network node 904 or an adversary transmitter 904'), at least one reference signal via a downlink channel.

At 1004, the UE may estimate an AM/PM impairment signature in the at least one reference signal. For example, 1004 may be performed by the physical layer security component 1440 in FIG. 14. Referring to FIG. 9, at 914, the UE 902 may estimate an AM/PM impairment signature in the at least one reference signal.

At 1006, the UE may identify whether the estimated AM/PM impairment signature matches a reference AM/PM impairment signature. For example, 1006 may be performed by the physical layer security component 1440 in FIG. 14. Referring to FIG. 9, at 916, the UE 902 may identify whether the estimated AM/PM impairment signature matches a reference AM/PM impairment signature.

At 1008, the UE may maintain or discard at least one slot associated with the downlink channel based on whether the estimated AM/PM impairment signature matches the reference AM/PM impairment signature. For example, 1008 may be performed by the physical layer security component 1440 in FIG. 14. Referring to FIG. 9, at 918, the UE 902 may maintain or discard at least one slot associated with the downlink channel based on whether the estimated AM/PM impairment signature matches the reference AM/PM impairment signature.

Figure 11:
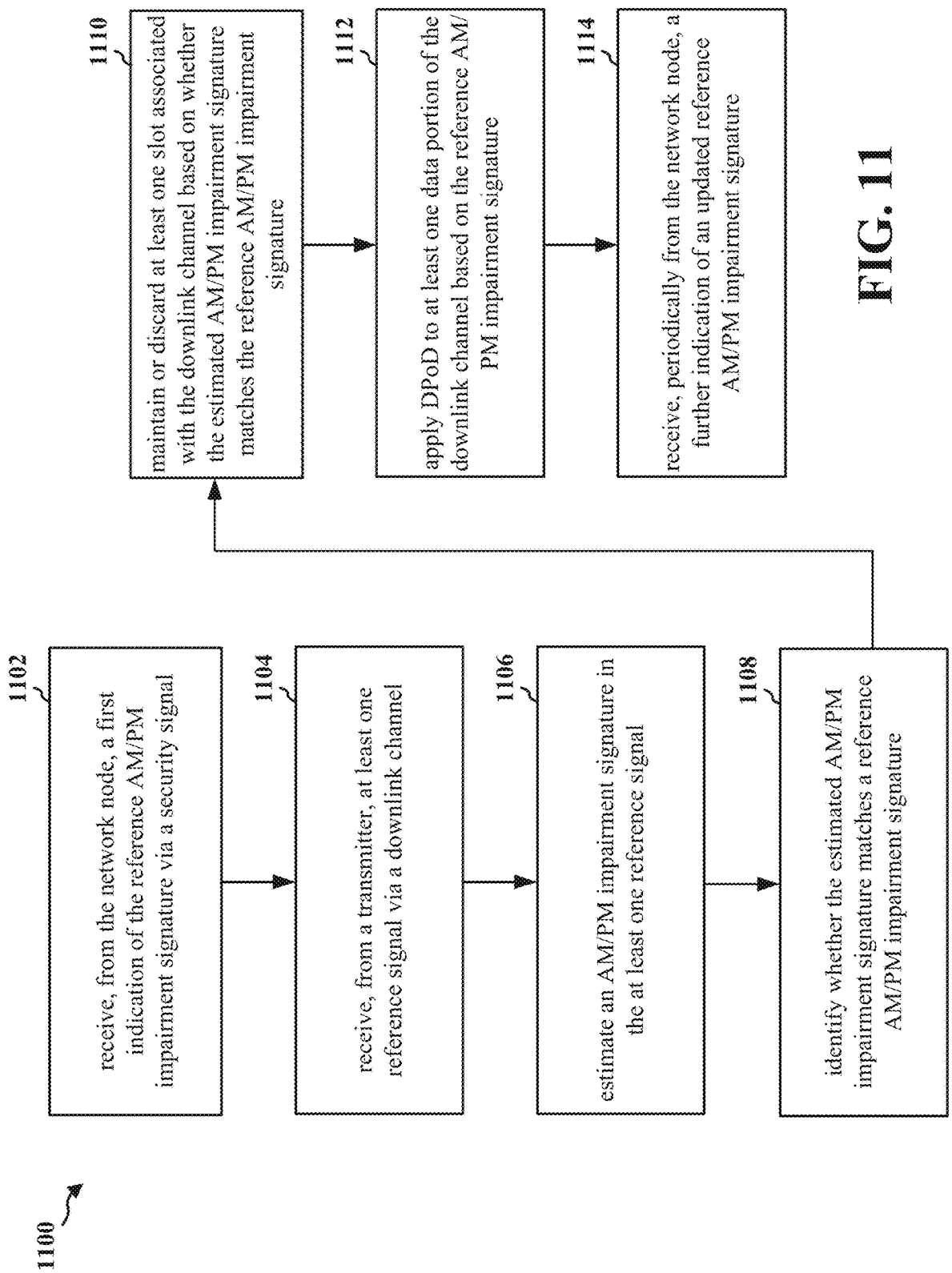
FIG. 11 is a flowchart of a method of wireless communication in accordance with various aspects of the present disclosure.

FIG. 11 is a flowchart 1100 of a method of wireless communication. The method may be performed by a UE (e.g., the UE 104/350/502/902; the apparatus 1402). At 1104, the UE may receive, from a transmitter, at least one reference signal via a downlink channel. For example, 1104 may be performed by the physical layer security component 1440 in FIG. 14. Referring to FIG. 9, at 912 or 912', the UE 902 may receive, from a transmitter (a network node 904 or an adversary transmitter 904'), at least one reference signal via a downlink channel.

At 1106, the UE may estimate an AM/PM impairment signature in the at least one reference signal. For example, 1106 may be performed by the physical layer security component 1440 in FIG. 14. Referring to FIG. 9, at 914, the UE 902 may estimate an AM/PM impairment signature in the at least one reference signal.

At 1108, the UE may identify whether the estimated AM/PM impairment signature matches a reference AM/PM impairment signature. For example, 1108 may be performed by the physical layer security component 1440 in FIG. 14. Referring to FIG. 9, at 916, the UE 902 may identify whether the estimated AM/PM impairment signature matches a reference AM/PM impairment signature.

At 1110, the UE may maintain or discard at least one slot associated with the downlink channel based on whether the estimated AM/PM impairment signature matches the reference AM/PM impairment signature. For example, 1110 may be performed by the physical layer security component 1440 in FIG. 14. Referring to FIG. 9, at 918, the UE 902 may maintain or discard at least one slot associated with the downlink channel based on whether the estimated AM/PM impairment signature matches the reference AM/PM impairment signature.

In one configuration, the at least one slot may be maintained if the estimated AM/PM impairment signature matches the reference AM/PM impairment signature. The at least one slot may be discarded if the estimated AM/PM impairment signature does not match the reference AM/PM impairment signature.

In one configuration, referring to FIG. 9, the transmitter may correspond to a network node 904 if the estimated AM/PM impairment signature matches the reference AM/PM impairment signature. The transmitter may correspond to an adversary transmitter 904' if the estimated AM/PM impairment signature does not match the reference AM/PM impairment signature.

In one configuration, at 1102, the UE may receive, from the network node, a first indication of the reference AM/PM impairment signature via a security signal. For example, 1102 may be performed by the physical layer security component 1440 in FIG. 14. Referring to FIG. 9, at 908, the UE 902 may receive, from the network node 904, a first indication of the reference AM/PM impairment signature via a security signal.

In one configuration, the security signal may correspond to a SERS or RRC signaling.

In one configuration, at 1114, the UE may receive, periodically from the network node, a further indication of an updated reference AM/PM impairment signature. For example, 1114 may be performed by the physical layer security component 1440 in FIG. 14. Referring to FIG. 9, at 922, the UE 902 may receive, periodically from the network node 904, a further indication of an updated reference AM/PM impairment signature.

In one configuration, referring to FIG. 9, at 916, whether the estimated AM/PM impairment signature matches the reference AM/PM impairment signature may be identified based on a correlation amount between the estimated AM/PM impairment signature and the reference AM/PM impairment signature.

In one configuration, the correlation amount may be identified based on an MRC approach.

In one configuration, the at least one reference signal is a DMRS.

In one configuration, the downlink channel may be a PDCCH or a PDSCH.

In one configuration, at 1112, the UE may apply DPoD to at least one data portion of the downlink channel based on the reference AM/PM impairment signature. For example, 1112 may be performed by the physical layer security component 1440 in FIG. 14. Referring to FIG. 9, at 920, the UE 902 may apply DPoD to at least one data portion of the downlink channel based on the reference AM/PM impairment signature.

Figure 12:
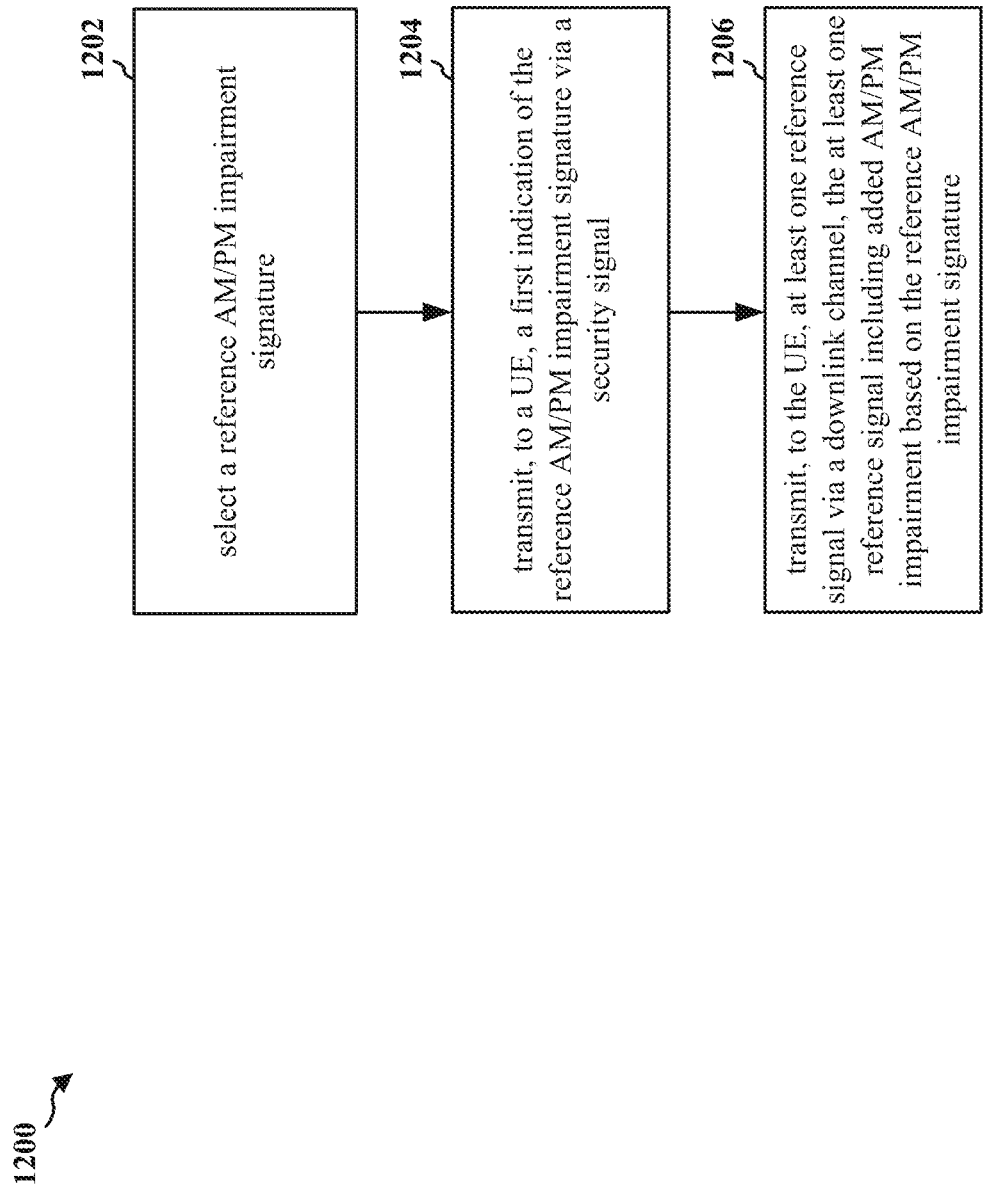
FIG. 12 is a flowchart of a method of wireless communication in accordance with various aspects of the present disclosure.

FIG. 12 is a flowchart 1200 of a method of wireless communication. The method may be performed by a network node (e.g., the base station/network node 102/180/310; the network node 504/904; the apparatus 1502). At 1202, the network node may select a reference AM/PM impairment signature. For example, 1202 may be performed by the physical layer security component 1540 in FIG. 15. Referring to FIG. 9, at 906, the network node 904 may select a reference AM/PM impairment signature.

At 1204, the network node may transmit, to a UE, a first indication of the reference AM/PM impairment signature via a security signal. For example, 1204 may be performed by the physical layer security component 1540 in FIG. 15. Referring to FIG. 9, at 908, the network node 904 may transmit, to a UE 902, a first indication of the reference AM/PM impairment signature via a security signal.

At 1206, the network node may transmit, to the UE, at least one reference signal via a downlink channel. The at least one reference signal may include added AM/PM impairment based on the reference AM/PM impairment signature. For example, 1206 may be performed by the physical layer security component 1540 in FIG. 15. Referring to FIG. 9, at 912, the network node 904 may transmit, to the UE 902, at least one reference signal via a downlink channel.

Figure 13:
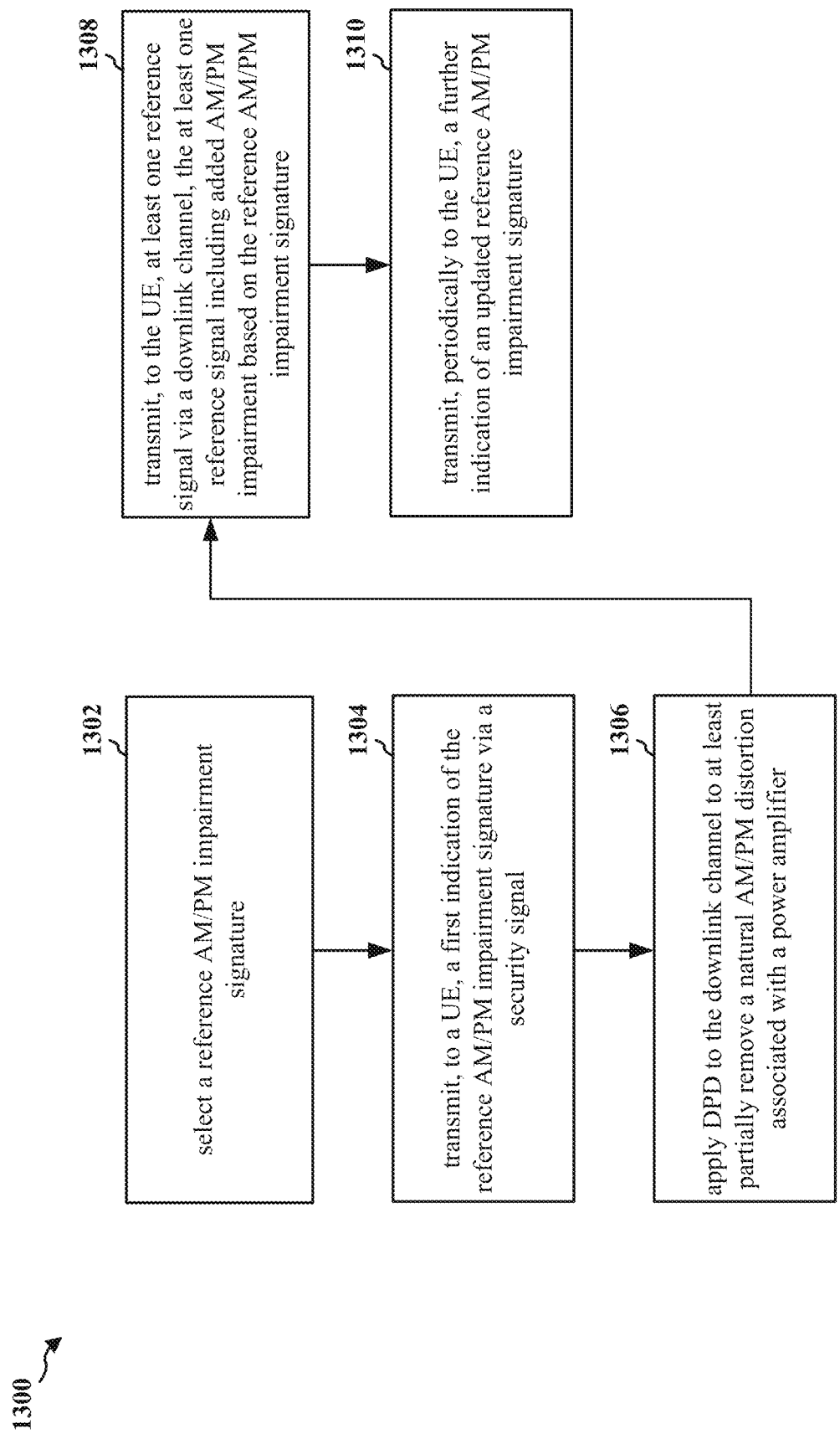
FIG. 13 is a flowchart of a method of wireless communication in accordance with various aspects of the present disclosure.

FIG. 13 is a flowchart 1300 of a method of wireless communication. The method may be performed by a network node (e.g., the base station/network node 102/180/310; the network node 504/904; the apparatus 1502). At 1302, the network node may select a reference AM/PM impairment signature. For example, 1302 may be performed by the physical layer security component 1540 in FIG. 15. Referring to FIG. 9, at 906, the network node 904 may select a reference AM/PM impairment signature.

At 1304, the network node may transmit, to a UE, a first indication of the reference AM/PM impairment signature via a security signal. For example, 1304 may be performed by the physical layer security component 1540 in FIG. 15. Referring to FIG. 9, at 908, the network node 904 may transmit, to a UE 902, a first indication of the reference AM/PM impairment signature via a security signal.

At 1308, the network node may transmit, to the UE, at least one reference signal via a downlink channel. The at least one reference signal may include added AM/PM impairment based on the reference AM/PM impairment signature. For example, 1308 may be performed by the physical layer security component 1540 in FIG. 15. Referring to FIG. 9, at 912, the network node 904 may transmit, to the UE 902, at least one reference signal via a downlink channel.

In one configuration, the added AM/PM impairment may be added to the at least one reference signal in a baseband domain.

In one configuration, the security signal may correspond to a SERS or RRC signaling.

In one configuration, at 1310, the network node may transmit, periodically to the UE, a further indication of an updated reference AM/PM impairment signature. For example, 1310 may be performed by the physical layer security component 1540 in FIG. 15. Referring to FIG. 9, at 922, the network node 904 may transmit, periodically to the UE 902, a further indication of an updated reference AM/PM impairment signature.

In one configuration, the at least one reference signal may be a DMRS.

In one configuration, the downlink channel may be a PDCCH or a PDSCH.

In one configuration, at 1306, the network node may apply DPD to the downlink channel to at least partially remove a natural AM/PM distortion associated with a power amplifier. For example, 1306 may be performed by the physical layer security component 1540 in FIG. 15. Referring to FIG. 9, at 910, the network node 904 may apply DPD to the downlink channel to at least partially remove a natural AM/PM distortion associated with a power amplifier.

In one configuration, the added AM/PM impairment may be further added to at least one data portion of the downlink channel.

Figure 14:
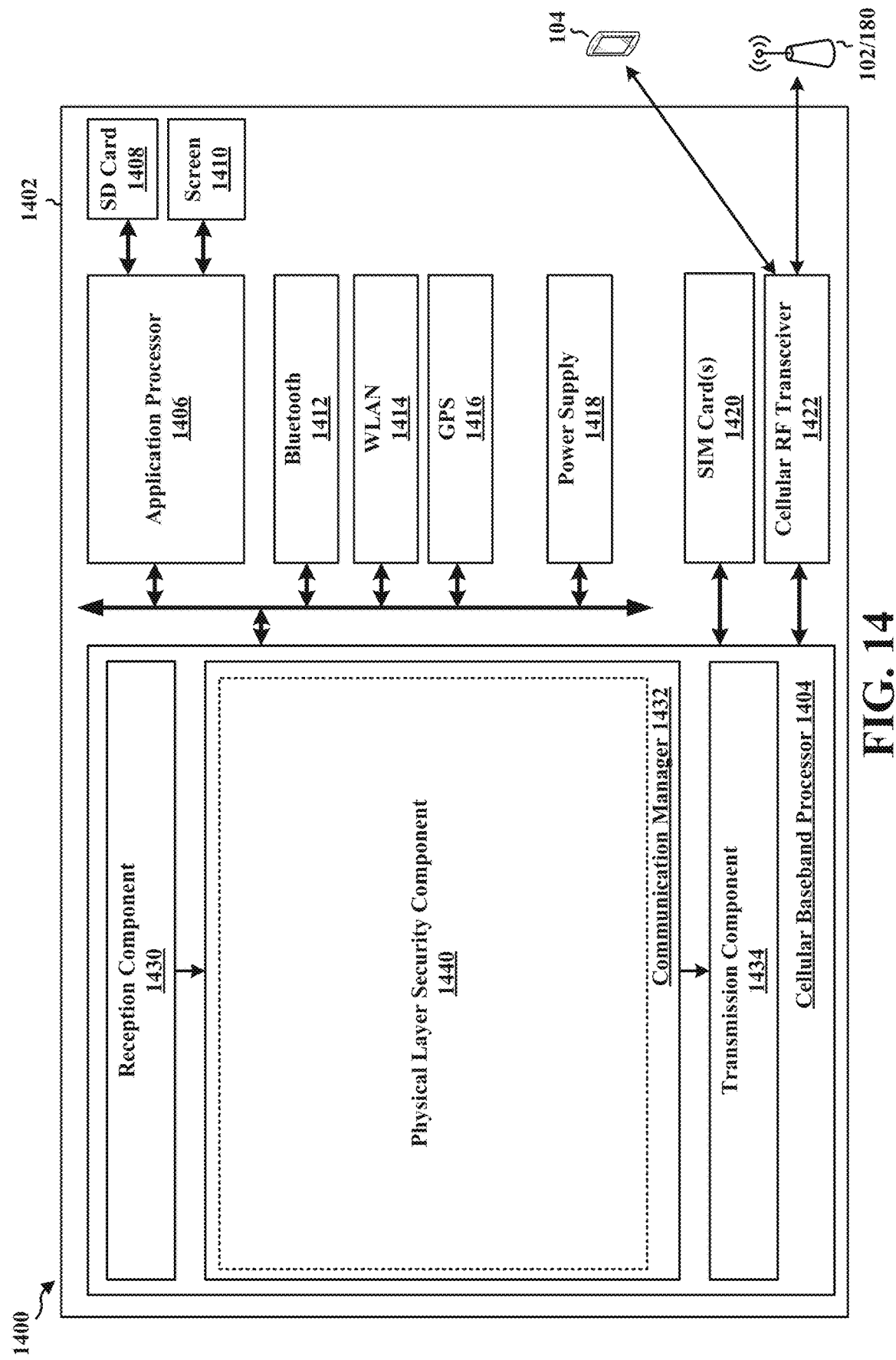
FIG. 14 is a diagram illustrating an example of a hardware implementation for an example apparatus in accordance with various aspects of the present disclosure.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a physical layer security component 1440 that may be configured to receive, from the network node, a first indication of the reference AM/PM impairment signature via a security signal, e.g., as described in connection with 1102 in FIG. 11. The physical layer security component 1440 may be configured to receive, from a transmitter, at least one reference signal via a downlink channel, e.g., as described in connection with 1002 in FIGS. 10 and 1104 in FIG. 11. The physical layer security component 1440 may be configured to estimate an AM/PM impairment signature in the at least one reference signal, e.g., as described in connection with 1004 in FIGS. 10 and 1106 in FIG. 11. The physical layer security component 1440 may be configured to identify whether the estimated AM/PM impairment signature matches a reference AM/PM impairment signature, e.g., as described in connection with 1006 in FIGS. 10 and 1108 in FIG. 11. The physical layer security component 1440 may be configured to maintain or discard at least one slot associated with the downlink channel based on whether the estimated AM/PM impairment signature matches the reference AM/PM impairment signature, e.g., as described in connection with 1008 in FIGS. 10 and 1110 in FIG. 11. The physical layer security component 1440 may be configured to apply DPoD to at least one data portion of the downlink channel based on the reference AM/PM impairment signature, e.g., as described in connection with 1112 in FIG. 11. The physical layer security component 1440 may be configured to receive, periodically from the network node, a further indication of an updated reference AM/PM impairment signature, e.g., as described in connection with 1114 in FIG. 11.

The apparatus may include additional components that perform each of the blocks of the algorithm in the flowcharts of FIGS. 9-11. As such, each block in the flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving, from a transmitter, at least one reference signal via a downlink channel. The apparatus 1402, and in particular the cellular baseband processor 1404, includes means for estimating an AM/PM impairment signature in the at least one reference signal. The apparatus 1402, and in particular the cellular baseband processor 1404, includes means for identifying whether the estimated AM/PM impairment signature matches a reference AM/PM impairment signature. The apparatus 1402, and in particular the cellular baseband processor 1404, includes means for maintaining or discarding at least one slot associated with the downlink channel based on whether the estimated AM/PM impairment signature matches the reference AM/PM impairment signature.

In one configuration, the at least one slot may be maintained if the estimated AM/PM impairment signature matches the reference AM/PM impairment signature. The at least one slot may be discarded if the estimated AM/PM impairment signature does not match the reference AM/PM impairment signature. In one configuration, the transmitter may correspond to a network node if the estimated AM/PM impairment signature matches the reference AM/PM impairment signature. The transmitter may correspond to an adversary transmitter if the estimated AM/PM impairment signature does not match the reference AM/PM impairment signature. In one configuration, the apparatus 1402, and in particular the cellular baseband processor 1404, includes means for receiving, from the network node, a first indication of the reference AM/PM impairment signature via a security signal. In one configuration, the security signal may correspond to a SERS or RRC signaling. In one configuration, the apparatus 1402, and in particular the cellular baseband processor 1404, includes means for receiving, periodically from the network node, a further indication of an updated reference AM/PM impairment signature. In one configuration, whether the estimated AM/PM impairment signature matches the reference AM/PM impairment signature may be identified based on a correlation amount between the estimated AM/PM impairment signature and the reference AM/PM impairment signature. In one configuration, the correlation amount may be identified based on an MRC approach. In one configuration, the at least one reference signal is a DMRS. In one configuration, the downlink channel may be a PDCCH or a PDSCH. In one configuration, the apparatus 1402, and in particular the cellular baseband processor 1404, includes means for applying DPoD to at least one data portion of the downlink channel based on the reference AM/PM impairment signature.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
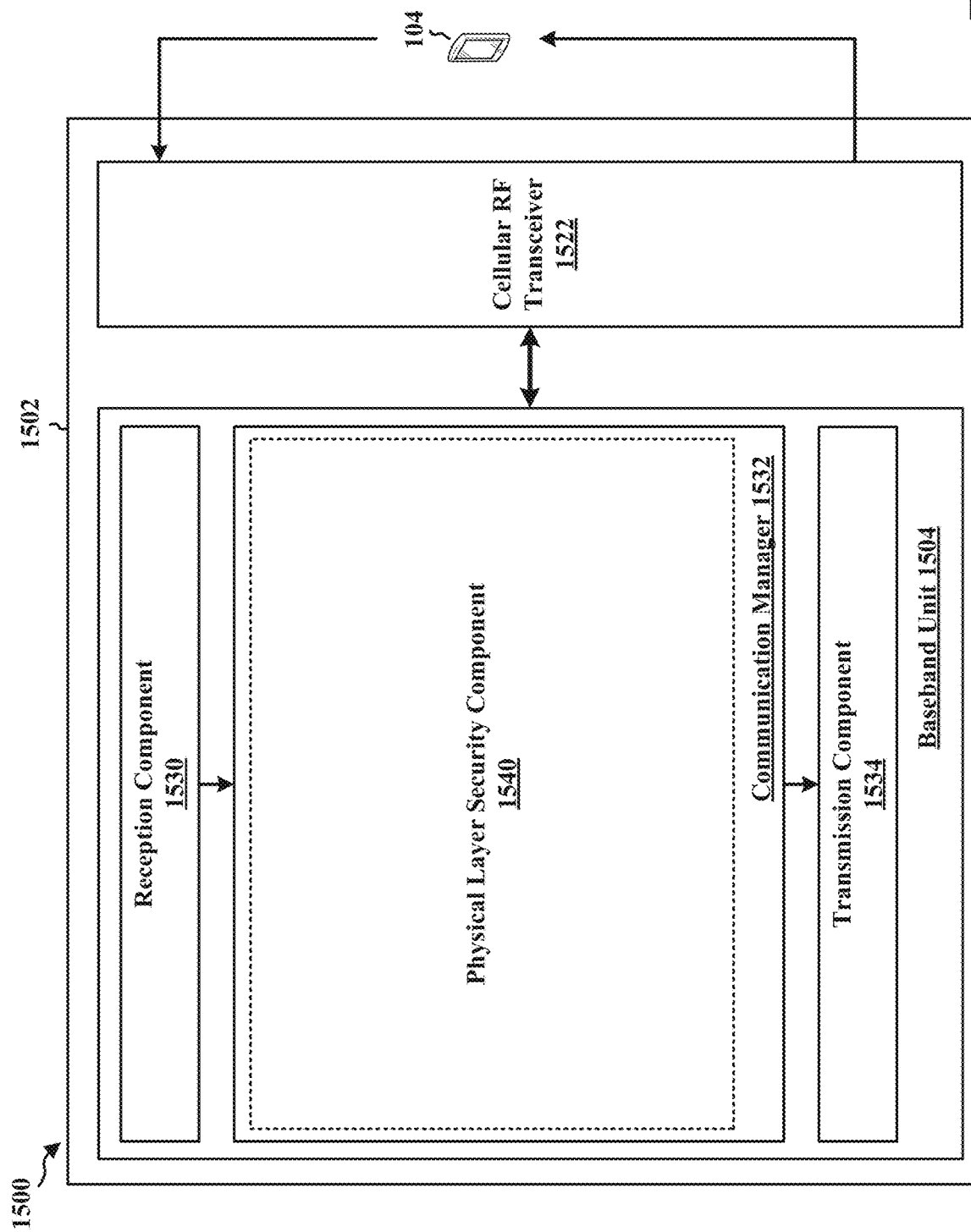
FIG. 15 is a diagram illustrating an example of a hardware implementation for an example apparatus in accordance with various aspects of the present disclosure.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a physical layer security component 1540 that may be configured to select a reference AM/PM impairment signature, e.g., as described in connection with 1202 in FIGS. 12 and 1302 in FIG. 13. The physical layer security component 1540 that may be configured to transmit, to a UE, a first indication of the reference AM/PM impairment signature via a security signal, e.g., as described in connection with 1204 in FIGS. 12 and 1304 in FIG. 13. The physical layer security component 1540 that may be configured to apply DPD to the downlink channel to at least partially remove a natural AM/PM distortion associated with a power amplifier, e.g., as described in connection with 1306 in FIG. 13. The physical layer security component 1540 that may be configured to transmit, to the UE, at least one reference signal via a downlink channel, e.g., as described in connection with 1206 in FIGS. 12 and 1308 in FIG. 13. The physical layer security component 1540 that may be configured to transmit, periodically to the UE, a further indication of an updated reference AM/PM impairment signature, e.g., as described in connection with 1310 in FIG. 13.

The apparatus may include additional components that perform each of the blocks of the algorithm in the flowcharts of FIGS. 9, 12, and 13. As such, each block in the flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for selecting a reference AM/PM impairment signature. The apparatus 1502, and in particular the baseband unit 1504, includes means for transmitting, to a UE, a first indication of the reference AM/PM impairment signature via a security signal. The apparatus 1502, and in particular the baseband unit 1504, includes means for transmitting, to the UE, at least one reference signal via a downlink channel. The at least one reference signal may include added AM/PM impairment based on the reference AM/PM impairment signature.

In one configuration, the added AM/PM impairment may be added to the at least one reference signal in a baseband domain. In one configuration, the security signal may correspond to a SERS or RRC signaling. In one configuration, the apparatus 1502, and in particular the baseband unit 1504, includes means for transmitting, periodically to the UE, a further indication of an updated reference AM/PM impairment signature. In one configuration, the at least one reference signal may be a DMRS. In one configuration, the downlink channel may be a PDCCH or a PDSCH. In one configuration, the apparatus 1502, and in particular the baseband unit 1504, includes means for applying DPD to the downlink channel to at least partially remove a natural AM/PM distortion associated with a power amplifier. In one configuration, the added AM/PM impairment may be further added to at least one data portion of the downlink channel.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-15, a network node may select a reference AM/PM impairment signature. The network node may transmit, to a UE, a first indication of the reference AM/PM impairment signature via a security signal. The network node may transmit, to the UE, at least one reference signal via a downlink channel. The at least one reference signal may include added AM/PM impairment based on the reference AM/PM impairment signature. The UE may receive, from a transmitter, at least one reference signal via a downlink channel. The UE may estimate an AM/PM impairment signature in the at least one reference signal. The UE may identify whether the estimated AM/PM impairment signature matches a reference AM/PM impairment signature. Further, the UE may maintain or discard at least one slot associated with the downlink channel based on whether the estimated AM/PM impairment signature matches the reference AM/PM impairment signature. Accordingly, a measure of physical layer security may be achieved. As mentioned above, the presence of the physical layer security may be associated with a number of improvements compared to scenarios where no physical layer security is utilized. For example, the physical layer security may provide an additional layer of security to deal with the quantum threat. Further, use of the physical layer security may help to reduce the load in L3, where applicable, and may, accordingly, help to reduce the latency and overhead. Moreover, use of the physical layer security may help to reduce the chances of becoming a victim of malicious intruders for protocols at layers below L3.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a transmitter, at least one reference signal via a downlink channel; estimate an AM/PM impairment signature in the at least one reference signal; identify whether the estimated AM/PM impairment signature matches a reference AM/PM impairment signature; and maintain or discard at least one slot associated with the downlink channel based on whether the estimated AM/PM impairment signature matches the reference AM/PM impairment signature.

Aspect 2 is the apparatus of aspect 1, where the at least one slot is maintained if the estimated AM/PM impairment signature matches the reference AM/PM impairment signature, and the at least one slot is discarded if the estimated AM/PM impairment signature does not match the reference AM/PM impairment signature.

Aspect 3 is the apparatus of any of aspects 1 and 2, where the transmitter corresponds to a network node if the estimated AM/PM impairment signature matches the reference AM/PM impairment signature, and the transmitter corresponds to an adversary transmitter if the estimated AM/PM impairment signature does not match the reference AM/PM impairment signature.

Aspect 4 is the apparatus of aspect 3, the at least one processor being further configured to: receive, from the network node, a first indication of the reference AM/PM impairment signature via a security signal.

Aspect 5 is the apparatus of aspect 4, where the security signal corresponds to a SERS or RRC signaling.

Aspect 6 is the apparatus of any of aspects 4 and 5, the at least one processor being further configured to: receive, periodically from the network node, a further indication of an updated reference AM/PM impairment signature.

Aspect 7 is the apparatus of any of aspects 1 to 6, where whether the estimated AM/PM impairment signature matches the reference AM/PM impairment signature is identified based on a correlation amount between the estimated AM/PM impairment signature and the reference AM/PM impairment signature.

Aspect 8 is the apparatus of aspect 7, where the correlation amount is identified based on an MRC approach.

Aspect 9 is the apparatus of any of aspects 1 to 8, where the at least one reference signal is a DMRS.

Aspect 10 is the apparatus of any of aspects 1 to 9, where the downlink channel is a PDCCH or a PDSCH.

Aspect 11 is the apparatus of any of aspects 1 to 10, the at least one processor being further configured to: apply DPoD to at least one data portion of the downlink channel based on the reference AM/PM impairment signature.

Aspect 12 is the apparatus of any of aspects 1 to 11, further including a transceiver coupled to the at least one processor.

Aspect 13 is an apparatus for wireless communication at a network node including at least one processor coupled to a memory and configured to select a reference AM/PM impairment signature; transmit, to a UE, a first indication of the reference AM/PM impairment signature via a security signal; and transmit, to the UE, at least one reference signal via a downlink channel, the at least one reference signal including added AM/PM impairment based on the reference AM/PM impairment signature.

Aspect 14 is the apparatus of aspect 13, where the added AM/PM impairment is added to the at least one reference signal in a baseband domain.

Aspect 15 is the apparatus of any of aspects 13 and 14, where the security signal corresponds to a SERS or RRC signaling.

Aspect 16 is the apparatus of any of aspects 13 to 15, the at least one processor being further configured to: transmit, periodically to the UE, a further indication of an updated reference AM/PM impairment signature.

Aspect 17 is the apparatus of any of aspects 13 to 16, where the at least one reference signal is a DMRS.

Aspect 18 is the apparatus of any of aspects 13 to 17, where the downlink channel is a PDCCH or a PDSCH.

Aspect 19 is the apparatus of any of aspects 13 to 18, the at least one processor being further configured to: apply DPD to the downlink channel to at least partially remove a natural AM/PM distortion associated with a power amplifier.

Aspect 20 is the apparatus of any of aspects 13 to 19, where the added AM/PM impairment is further added to at least one data portion of the downlink channel.

Aspect 21 is the apparatus of any of aspects 13 to 20, further including a transceiver coupled to the at least one processor.

Aspect 22 is a method of wireless communication for implementing any of aspects 1 to 21.

Aspect 23 is an apparatus for wireless communication including means for implementing any of aspects 1 to 21.

Aspect 24 is a computer-readable medium storing computer executable code, where the code when executed by a processor causes the processor to implement any of aspects 1 to 21.

What is claimed is:

1. An apparatus for wireless communication at a user equipment (UE), comprising:
   a memory;
   and at least one processor coupled to the memory and configured to:
   receive, from a transmitter, at least one reference signal via a downlink channel;
   estimate an amplitude-modulation-to-phase-modulation (AM/PM) impairment signature in the at least one reference signal;
   identify whether the estimated AM/PM impairment signature matches a reference AM/PM impairment signature; and
   maintain or discard at least one slot associated with the downlink channel based on whether the estimated AM/PM impairment signature matches the reference AM/PM impairment signature.

2. The apparatus of claim 1, wherein the at least one slot is maintained if the estimated AM/PM impairment signature matches the reference AM/PM impairment signature, and the at least one slot is discarded if the estimated AM/PM impairment signature does not match the reference AM/PM impairment signature.

3. The apparatus of claim 1, wherein the transmitter corresponds to a network node if the estimated AM/PM impairment signature matches the reference AM/PM impairment signature, and the transmitter corresponds to an adversary transmitter if the estimated AM/PM impairment signature does not match the reference AM/PM impairment signature.

4. The apparatus of claim 3, the at least one processor being further configured to:
   receive, from the network node, a first indication of the reference AM/PM impairment signature via a security signal.

5. The apparatus of claim 4, wherein the security signal corresponds to a security reference signal (SERS) or radio resource control (RRC) signaling.

6. The apparatus of claim 4, the at least one processor being further configured to:
   receive, periodically from the network node, a further indication of an updated reference AM/PM impairment signature.

7. The apparatus of claim 1, wherein whether the estimated AM/PM impairment signature matches the reference AM/PM impairment signature is identified based on a correlation amount between the estimated AM/PM impairment signature and the reference AM/PM impairment signature.

8. The apparatus of claim 7, wherein the correlation amount is identified based on a maximal-ratio combining (MRC) approach.

9. The apparatus of claim 1, wherein the at least one reference signal is a demodulation reference signal (DMRS).

10. The apparatus of claim 1, wherein the downlink channel is a physical downlink control channel (PDCCH) or a physical downlink shared channel (PDSCH).

11. The apparatus of claim 1, the at least one processor being further configured to:
    apply digital post-distortion (DPoD) to at least one data portion of the downlink channel based on the reference AM/PM impairment signature.

12. The apparatus of claim 1, further comprising a transceiver coupled to the at least one processor, wherein the apparatus is a wireless communication device.

13. A method of wireless communication at a user equipment (UE), comprising:
    receiving, from a transmitter, at least one reference signal via a downlink channel;
    estimating an amplitude-modulation-to-phase-modulation (AM/PM) impairment signature in the at least one reference signal;
    identifying whether the estimated AM/PM impairment signature matches a reference AM/PM impairment signature; and
    maintaining or discarding at least one slot associated with the downlink channel based on whether the estimated AM/PM impairment signature matches the reference AM/PM impairment signature.

14. The method of claim 13, wherein the at least one slot is maintained if the estimated AM/PM impairment signature matches the reference AM/PM impairment signature, and the at least one slot is discarded if the estimated AM/PM impairment signature does not match the reference AM/PM impairment signature.

15. The method of claim 13, wherein the transmitter corresponds to a network node if the estimated AM/PM impairment signature matches the reference AM/PM impairment signature, and the transmitter corresponds to an adversary transmitter if the estimated AM/PM impairment signature does not match the reference AM/PM impairment signature.

16. An apparatus for wireless communication at a network node, comprising:
    a memory; and
    at least one processor coupled to the memory and configured to:
    select a reference amplitude-modulation-to-phase-modulation (AM/PM) impairment signature;
    transmit, to a user equipment (UE), a first indication of the reference AM/PM impairment signature via a security signal; and
    transmit, to the UE, at least one reference signal via a downlink channel, the at least one reference signal including added AM/PM impairment based on the reference AM/PM impairment signature,
    wherein the UE identifies whether an estimated AM/PM impairment signature matches the reference AM/PM impairment signature.

17. The apparatus of claim 16, wherein the added AM/PM impairment is added to the at least one reference signal in a baseband domain.

18. The apparatus of claim 16, wherein the security signal corresponds to a security reference signal (SERS) or radio resource control (RRC) signaling.

19. The apparatus of claim 16, the at least one processor being further configured to:
transmit, periodically to the UE, a further indication of an updated reference AM/PM impairment signature.

20. The apparatus of claim 16, wherein the at least one reference signal is a demodulation reference signal (DMRS).

21. The apparatus of claim 16, wherein the downlink channel is a physical downlink control channel (PDCCH) or a physical downlink shared channel (PDSCH).

22. The apparatus of claim 16, the at least one processor being further configured to:
apply digital pre-distortion (DPD) to the downlink channel to at least partially remove a natural AM/PM distortion associated with a power amplifier.

23. The apparatus of claim 16, wherein the added AM/PM impairment is further added to at least one data portion of the downlink channel.

24. The apparatus of claim 16, further comprising a transceiver coupled to the at least one processor, wherein the apparatus is a wireless communication device.

25. A method of wireless communication at a network node, comprising:
selecting a reference amplitude-modulation-to-phase-modulation (AM/PM) impairment signature;
transmitting, to a user equipment (UE), a first indication of the reference AM/PM impairment signature via a security signal; and
transmitting, to the UE, at least one reference signal via a downlink channel, the at least one reference signal including added AM/PM impairment based on the reference AM/PM impairment signature,
wherein the UE identifies whether an estimated AM/PM impairment signature matches the reference AM/PM impairment signature.

26. The method of claim 25, wherein the added AM/PM impairment is added to the at least one reference signal in a baseband domain.

27. The method of claim 25, wherein the security signal corresponds to a security reference signal (SERS) or radio resource control (RRC) signaling.

28. The method of claim 25, further comprising: transmitting, periodically to the UE, a further indication of an updated reference AM/PM impairment signature.

29. The method of claim 25, wherein the at least one reference signal is a demodulation reference signal (DMRS).

30. The method of claim 25, wherein the downlink channel is a physical downlink control channel (PDCCH) or a physical downlink shared channel (PDSCH).

* * * * *